(12) United States Patent
Vaughn et al.

(10) Patent No.: US 8,756,115 B2
(45) Date of Patent: Jun. 17, 2014

(54) SYSTEM AND METHOD FOR CONSTRUCTING AND MARKETING A MODULAR BIRD FEEDER

(75) Inventors: William Vaughn, Lititz, PA (US); Karolyn Warfel, Willow Street, PA (US)

(73) Assignee: Woodstream Corporation, Lititz, PA (US)

( * ) Notice: Subject to any disclaimer, the term of this patent is extended or adjusted under 35 U.S.C. 154(b) by 0 days.

(21) Appl. No.: 13/618,849

(22) Filed: Sep. 14, 2012

(65) Prior Publication Data

US 2014/0076241 A1    Mar. 20, 2014

(51) Int. Cl.
*G06Q 30/00* (2012.01)

(52) U.S. Cl.
USPC .............. 705/26.5; 705/26.1; 119/72; 119/74

(58) Field of Classification Search
CPC ................. G06Q 30/0601; G06Q 30/0645
USPC ............................. 705/26.1–27.2; 119/72, 74
See application file for complete search history.

(56) References Cited

U.S. PATENT DOCUMENTS

2012/0060762 A1* 3/2012 Cowger et al. ................. 119/74

OTHER PUBLICATIONS

Chapters online launches villa.ca, offering canada's most comprehensive line of home and garden products online. (Jul. 31, 2000). Canada NewsWire. Retrieved from http://search.proquest.com/docview/455912423?accountid=14753.*

* cited by examiner

*Primary Examiner* — Resha Desai
(74) *Attorney, Agent, or Firm* — Jacobson Holman PLLC

(57) ABSTRACT

A modular system and method is provided that enables the consumer to design/build his or her own bird feeder based on interchangeable modular components that include multiple bases of different styles, multiple nutrient reservoirs of different styles, and one or more additional components, each having different styles. The system and method provides an on-line store that allows consumers to view the various styles for each component and to select their own base, reservoir, etc. Once the desired components have been selected on-line, a bill of materials listing the components is printed at a manufacturing facility where the selected components are pulled from a common inventory, assembled into a custom feeder and shipped to the consumer.

12 Claims, 25 Drawing Sheets

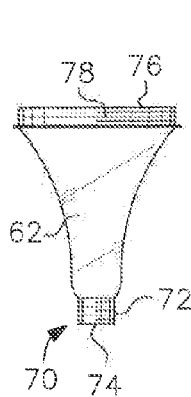 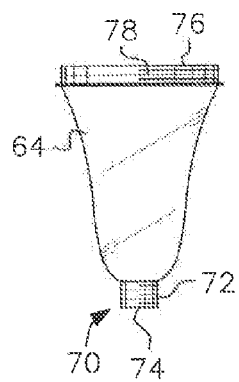 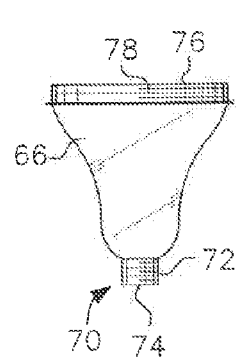 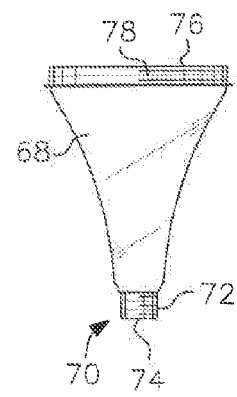
FIG. 4A  FIG. 4B  FIG. 4C  FIG. 4D
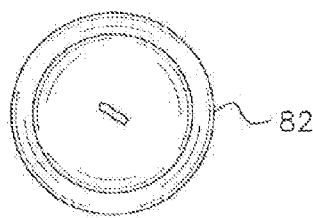 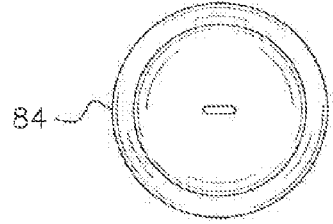
FIG. 5A  FIG. 5B

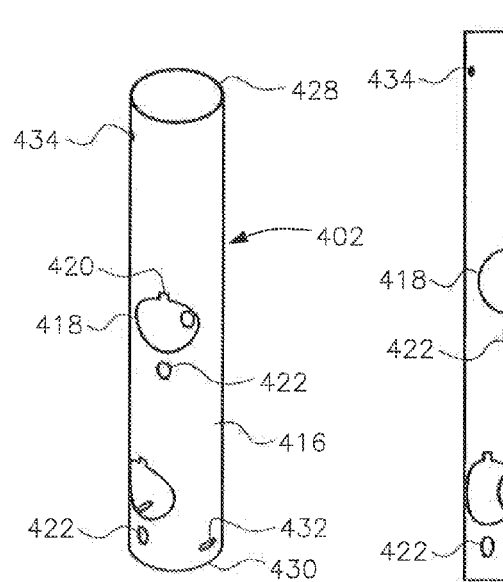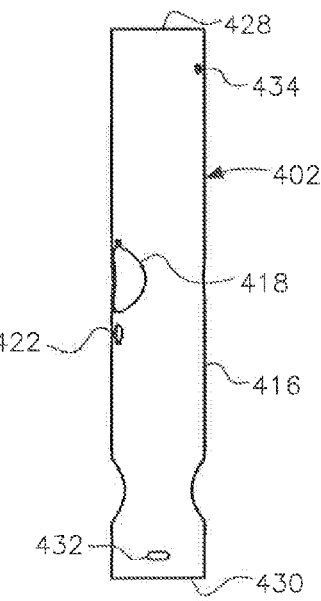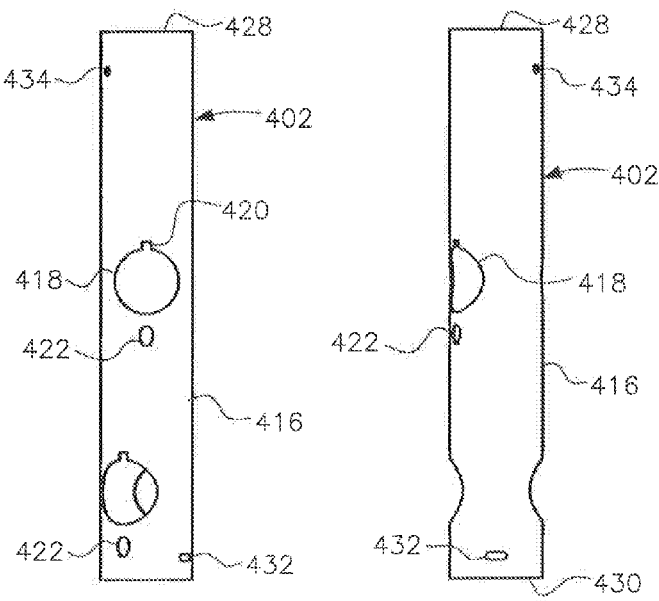
FIG. 11A   FIG. 11B   FIG. 11C
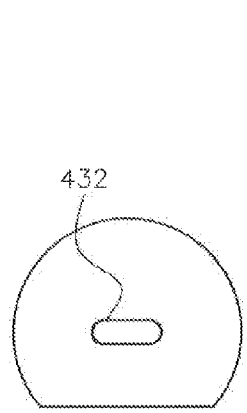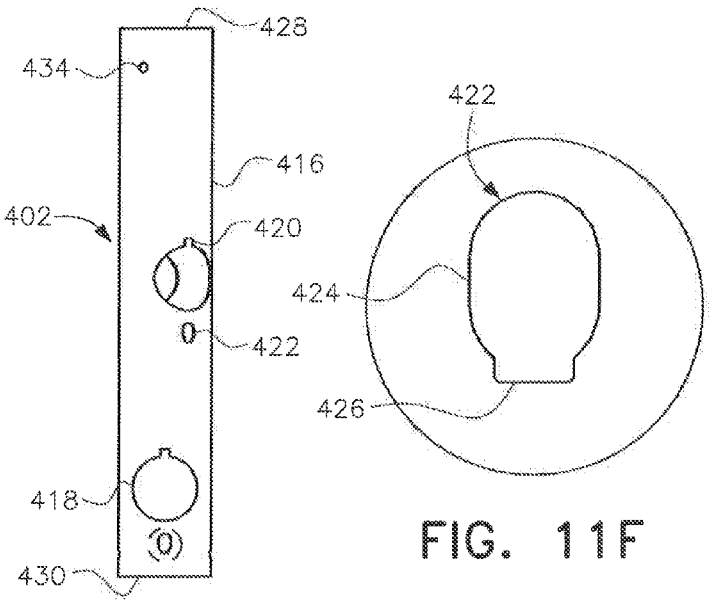
FIG. 11D   FIG. 11E   FIG. 11F

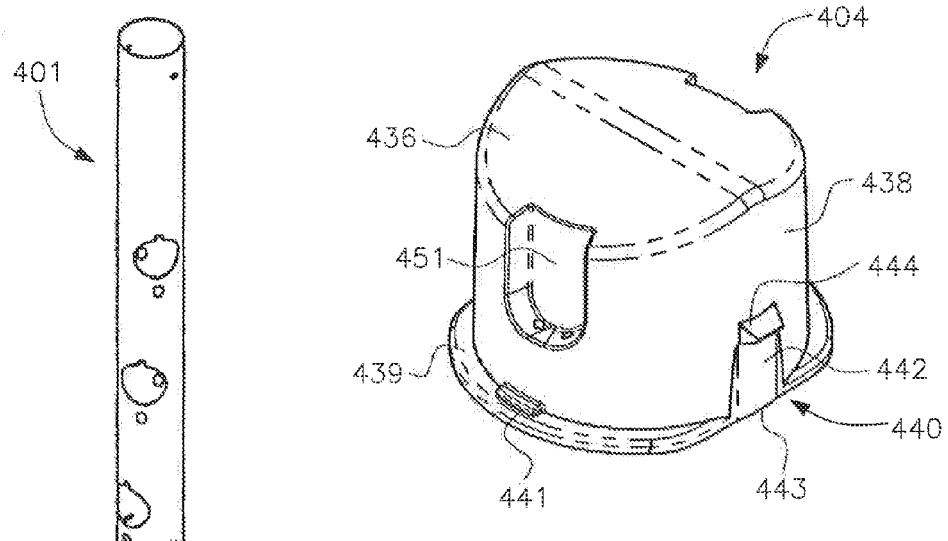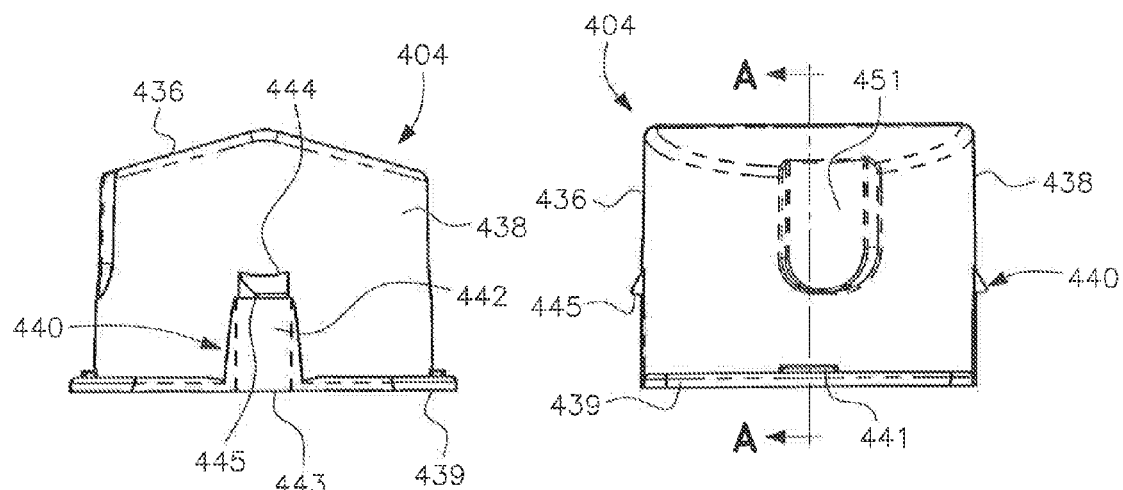
FIG. 12
FIG. 13A
FIG. 13B
FIG. 13C

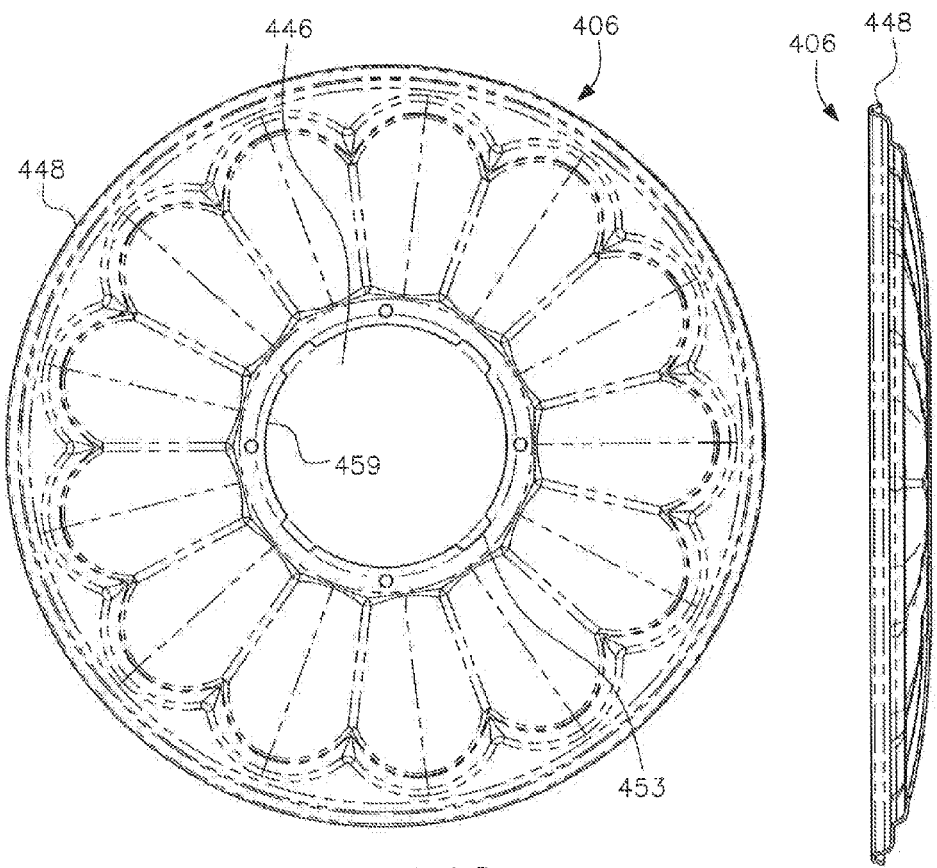
FIG. 14C
FIG. 14D
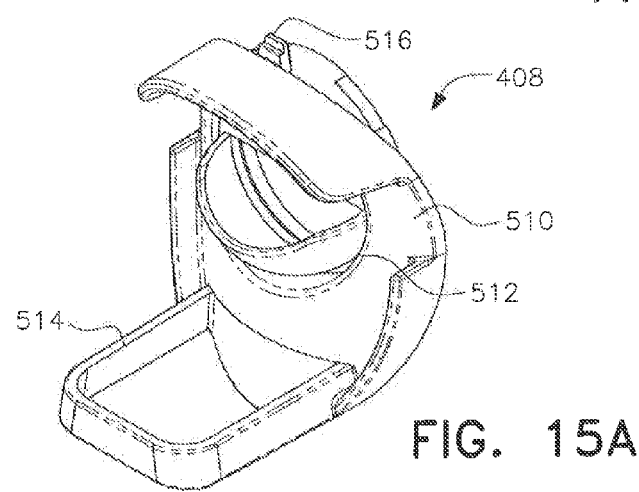
FIG. 15A

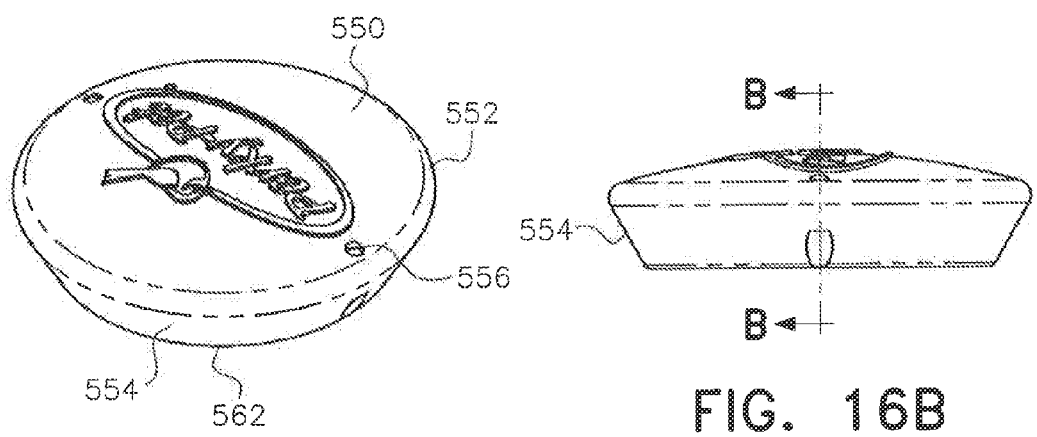
FIG. 16A
FIG. 16B
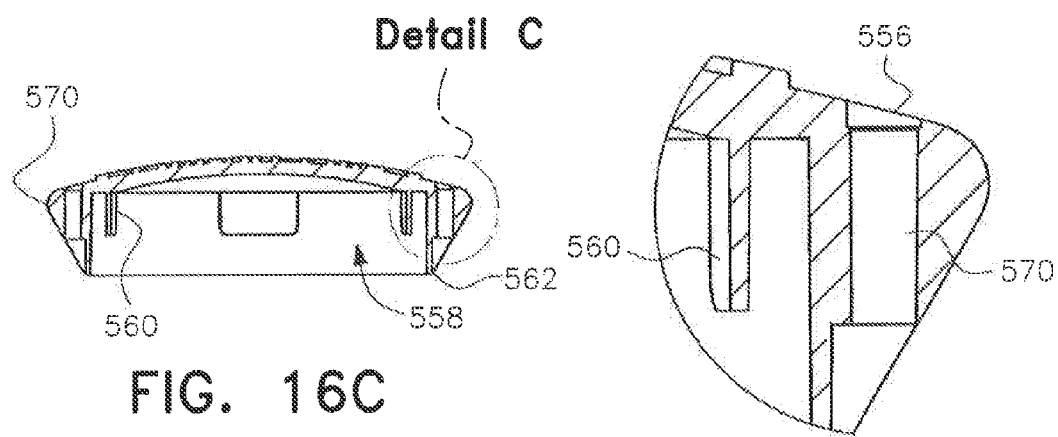
FIG. 16C
FIG. 16D

SYSTEM AND METHOD FOR CONSTRUCTING AND MARKETING A MODULAR BIRD FEEDER

FIELD OF THE INVENTION

The present invention generally relates to bird feeders and, more particularly, to a system and method for constructing and marketing a modular bird feeder having interchangeable parts to allow the consumer to combine different part styles to design a personalized feeder.

BACKGROUND OF THE INVENTION

Consumers have different tastes and preferences as to what makes a feeder most attractive, both to themselves when viewing the birds at the feeder and to hummingbirds who must be drawn to the feeder by its appearance. In many cases, hummingbird feeders have red components as red is known to be attractive to hummingbirds. However, different feeding port enhancements may be used that include artificial flowers of various colors, shapes and textures that simulate the flowers from which hummingbirds would naturally feed. As a result, the traditional hummingbird feeder market has evolved from a few basic models into a choice of a large number of different feeders. A similar complexity has developed in the market for seed bird feeders as these feeders may also be designed in a number of different ways. Thus, in response to evolving consumer tastes and demands and competitive pressures within the bird feeder market, bird feeder manufacturers are compelled to continuously create new feeder designs in order to provide a wide selection for the consumer.

Whenever the design of a bird feeder is changed, new parts must be created and different tooling must be produced for each of the new feeder parts. The new parts must then be manufactured and inventoried. In addition, different packaging designs are needed to accommodate the different feeder styles. As a result, the manufacturer faces higher costs for labor, material, handling and inventory, and the retailer must manage and organize a large number of different feeders for display and sale.

In addition, the variety of feeder designs presents the consumer with differently shaped liquid/seed reservoirs and differently configured bases and feed ports. In some cases, the consumer may prefer the base design of one feeder while liking the reservoir shape that is incorporated within another feeder. This leaves the consumer with the need to choose between two features that are both desired but which are not available in the same feeder.

Therefore, a need exists for a system and method of producing and marketing a variety of different bird feeder designs having different appearances and styles by variously combining interchangeable components drawn from a shared set of parts so as to best fulfill the consumer's desires while also reducing manufacturing and retailing burdens that result from multiple independent feeder designs.

SUMMARY OF THE INVENTION

In view of the foregoing, it is an object of the present invention to provide a system and method of building a modular bird feeder that enables the user to construct a customized feeder by selecting from several styles of each feeder component to assemble a feeder that best suits his or her needs and preferences.

Another object of the present invention is to provide a system and method of constructing and purchasing a consumer-built bird feeder through an on-line web site, herein referred to as the "build-a-feeder web site".

Yet another object of the present invention is to provide an on-line system and method for constructing a consumer-built hummingbird feeder by which the consumer selects one of a plurality of available design alternatives for feeder bases, feed port flower enhancements and nectar reservoirs, enabling the consumer to build his or her own hummingbird feeder, and to purchase the consumer-designed feeder on-line over a distributed computer network such as the Internet.

A further object of the present invention is to provide an on-line system and method for constructing and purchasing a consumer-built seed bird feeder by which the consumer selects one of a plurality of available design alternatives for seed reservoirs, caps, ports, trays and hangers, enabling the consumer to build his or her own seed bird feeder, and to purchase the consumer-designed feeder on line.

Another object of the present invention is to provide an improved method of marketing hummingbird feeders and seed bird feeders, and related accessories, by providing a web site at which the consumer can review a range of design alternatives for each of a plurality of individual feeder components which the consumer can combine in a multiplicity of ways to build a custom feeder.

A further object of the present invention is to provide an improved method of marketing hummingbird feeders and seed bird feeders in accordance with the preceding object that simplifies the manufacturing process by relying on a baseline set of modular feeder components which can be variously combined to create many designs, all from the same baseline set of feeder parts.

Accordingly, the present invention is directed to a system and method of building hummingbird and seed feeders from multiple modular feeder components, each component being manufactured with a plurality of different styles or designs, the components being interchangeable, to form bird feeders having a plurality of configurations and/or assembly arrangements so that the feeders as assembled have different styles and appearances. The present invention is also directed to an improved method of marketing bird feeders by allowing the consumer to choose his or her own component combination(s) while the manufacturer relies on a baseline set of feeder parts to simplify the feeder component manufacturing and retail processes.

Initially, the consumer accesses a build-a-feeder web site where the various feeder component designs are displayed. The consumer then embarks upon a selection process to create a selected bird feeder design from the available components provided on the web site.

To design a hummingbird feeder from scratch, the consumer first chooses a base that he or she prefers from the different base designs. Next, the consumer selects a flower/feed port enhancement from a plurality of flower/feed port enhancement designs based on the choice of base already made. Finally, the consumer chooses a reservoir or nectar container from a plurality of different top fill styles and sizes, with an associated cap being automatically assigned to complete the feeder.

The process of building a seed feeder from scratch is also performed in a similar way, with the consumer choosing a reservoir, cap, tray, feed ports, etc. from a plurality of design alternatives available for each component.

The web site also provides the consumer with a display of previously designed feeders. The consumer can choose to order one of these feeders "as is" or "off the rack", or to customize one or more components of one of these feeders to create a modified feeder design based upon a previously designed feeder.

Whichever approach is taken, i.e., building from scratch, buying "off the rack", or customizing an existing design, after the consumer has completed his or her selections, the on-line method of the present invention provides the consumer with a cart containing the consumer's component selections, and the ability to proceed to checkout to finalize the purchase and pay for his/her product(s). A bill of material reflecting the consumer's order is stored to a server where it is then printed at the manufacturing facility. The manufacturing facility then pulls the necessary parts from inventory and builds the feeder prior to shipment.

The foregoing objects together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE FIGURES

FIGS. 4A-4D are four types of nectar vessels or reservoirs available to a consumer when custom building a personalized hummingbird feeder in accordance with the present invention.

FIGS. 5A and 5B are two types of caps used to complete the customized hummingbird feeder in accordance with the present invention.

FIG. 11A is a perspective side view of the tube component shown in FIGS. 9 and 10, having four ports therein.

FIG. 11B is a side view of the tube component shown in FIG. 11A.

FIG. 11C is side view of the tube component shown in FIG. 11B upon clockwise rotation of approximately 30 degrees.

FIG. 11D is an enlarged view of detail "E" shown in FIG. 11C.

FIG. 11E is a side view of the tube component shown in FIG. 11B upon counter clockwise of approximately 30 degrees.

FIG. 11F is an enlarged view of detail "A" shown in FIG. 11E.

FIG. 12 is a perspective side view of a larger tube component available to the consumer, having six ports therein.

FIG. 13A is a perspective side view of the base component for the feeder shown in FIGS. 9 and 10.

FIG. 13B is a side view of the base component shown in FIG. 13A.

FIG. 13C is a side view of the base component shown in FIG. 13B rotated 90 degrees.

FIG. 14C is a top view of the tray component shown in FIG. 14A.

FIG. 14D is a cross sectional view of the tray component taken along line A-A of FIG. 14C.

FIG. 15A is a perspective side view of the feed port and perch assembly component for the feeder shown in FIGS. 9 and 10.

FIG. 16A is a perspective side view of the cap component for the feeder shown in FIGS. 9 and 10.

FIG. 16B is a side view of the cap component shown in FIG. 16A.

FIG. 16C is a cross sectional view of the cap component taken along line B-B of FIG. 16B.

FIG. 16D is an enlarged view of detail "C" shown in FIG. 16C.

DETAILED DESCRIPTION OF THE PREFERRED EMBODIMENTS

Figure 1:
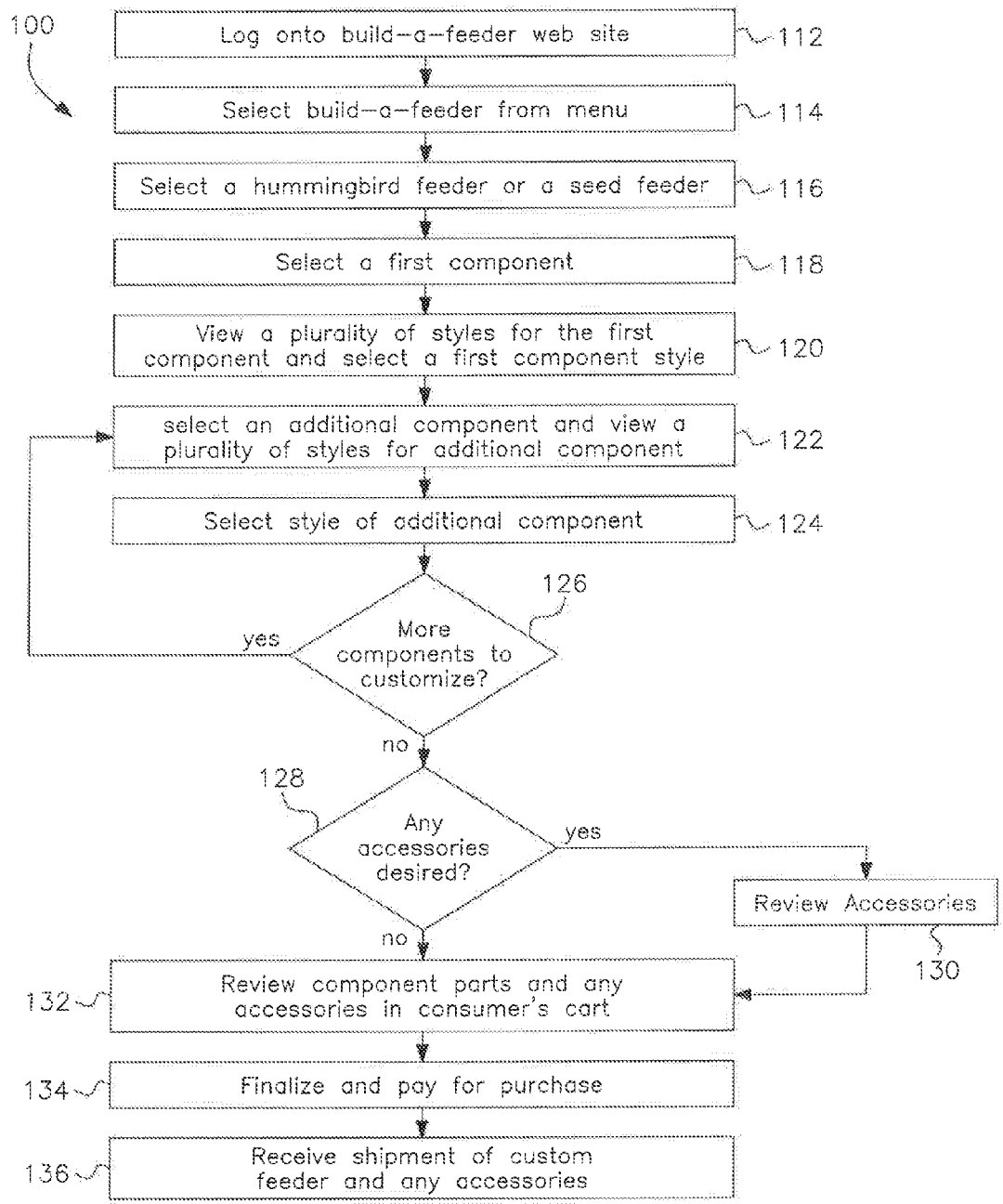
FIG. 1 is a flow chart summarizing the custom-build process of the build-a-feeder system and method for making a bird feeder according to the present invention.

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

As shown in FIG. 1, the present invention is directed to a system and method, generally designated by reference numeral 100, of constructing a modular bird feeder from a plurality of interchangeable consumer-selected components. The components generally include a base, a reservoir, a cap and feeder ports.

According to a preferred embodiment of the invention, the consumer logs onto the build-a-feeder web site, step 112, and then selects the build-a-feeder menu option at the web site, step 114, bringing the consumer to the design-a-feeder web page. From the design-a-feeder web page, the consumer chooses whether to build a hummingbird feeder or a seed feeder, step 116. Upon making this selection, the build-a-feeder process begins with the consumer selecting a first one of a plurality of component types, e.g., base, reservoir, etc., step 118. Once the component type is selected, the consumer then views a plurality of designs for the first component from which the consumer selects a first component style, step 120. The consumer next selects another component to customize and views a plurality of styles available for the other feeder component, step 122, and then selects a style for the other component, step 124. If there are more components to customize, step 126, the consumer repeats steps 122-126 for each additional component.

In addition to enabling the consumer to select a desired style for each of a plurality of feeder components, the build-a-feeder web site also provides the consumer with the opportunity to order accessories to go along with his or her feeder, step 128. The consumer may select the accessory option at any time during the feeder building process. If the consumer desires accessories, the consumer selects the accessory option and reviews a plurality of available accessories, step 130. These accessories can include nectar, cleaning mops, ant guards, wild bird books, seed, baffles, poles, etc.

Once the feeder component and/or accessory selection process is complete, the consumer can review the components and any desired accessories which are displayed as the consumer's web cart, step 132. The consumer then finalizes and pays for his or her purchase at the web site, step 134. The custom feeder is thereafter built according to the consumer's order and the process is complete when the consumer receives shipment of the custom feeder, step 136.

Figure 2A:
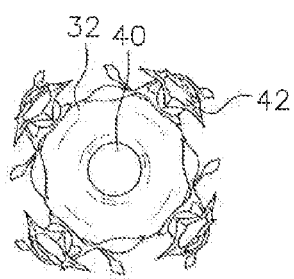
FIGS. 2A-2C are three types of base designs available to a consumer when custom building a personalized hummingbird feeder in accordance with the present invention.
Figure 2B:
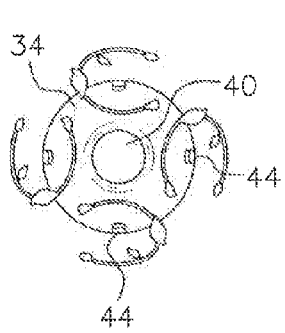
Figure 2C:
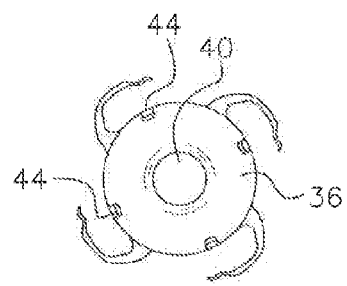

When building a hummingbird feeder, the first component to be selected is a base. Representative base designs are shown in FIGS. 2A, 2B and 2C. Each of the bases 32, 34, 36 has an internally threaded top opening 40 that is the same as that of the other bases so that each base can accommodate the bottleneck of any of the reservoir or vessel designs. In one embodiment, each base includes a push-pull valve of the type described in co-pending application, U.S. Ser. No. 12/213,924 ("the '924 application"). The '924 application is hereby expressly incorporated by reference as if fully set forth herein in its entirety.

As evident from FIG. 2A showing base 32, the base style may have pre-mounted feed port enhancements 42 in the form of flowers and vines. While the feed port enhancements shown herein are primarily flowers, it is to be understood that other feed port enhancements could be used that do not simulate flowers but may nonetheless serve to increase the attractiveness of the feeder to the hummingbirds being drawn to the feeder and/or to the consumer. Therefore, any time the phrase "feed port flower" is used, this phrase is intended to encompass any kind of structure used to enhance the appearance and/or function of the feed ports or openings formed in the base for bird feeding.

The bases 34 and 36 shown in FIGS. 2B and 2C have feed ports 44 formed as openings in the upper surface of the base within which a consumer-selected style or type of feed port flower (see FIGS. 3A-3C) may be inserted and secured. Each feed port opening has the same size and configuration to receive the flower connecting part as described hereinafter. For bases like those shown in FIGS. 2B and 2C, the next component to be selected is a feed port flower.

Figure 3A:
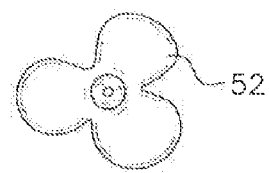
FIGS. 3A-3C are three types of feed port enhancements in the form of flowers that are available to a consumer when building a personalized hummingbird feeder using the bases shown in FIGS. 2B and 2C (the FIG. 2A base design already includes flower feed port enhancements)
Figure 3B:
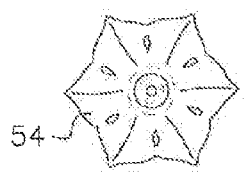
Figure 3C:
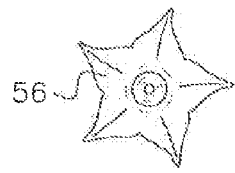

Three possible feed port flower types 52, 54, 56 are shown in FIGS. 3A, 3B and 3C. While three feed port flower designs are shown, it is understood that the invention is not limited to these particular flower choices and colors or only three selections. The flower design types 52, 54, 56 could be offered in a variety of colors which would be presented to the user after the flower type was chosen.

Figure 3D:
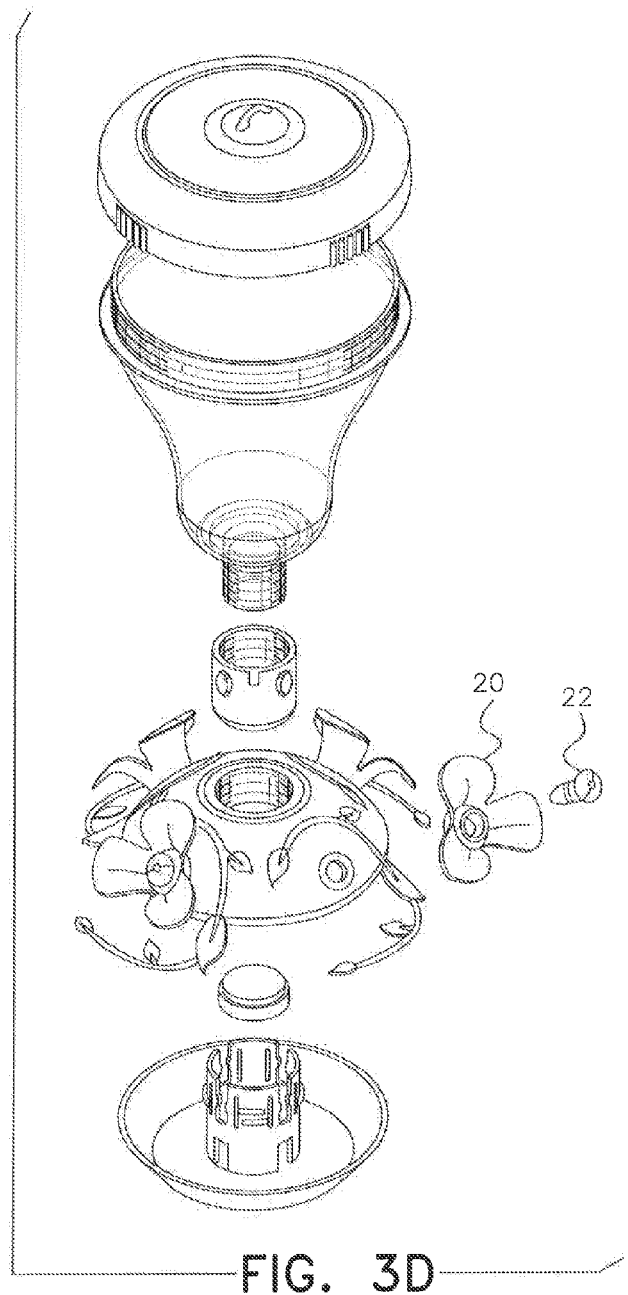
FIG. 3D is a representative illustration of the connecting and ornamental parts used in each flower design.

As shown in FIG. 3D, each type of feed port flower has an ornamental part 20 and a connecting part 22. Each of the ornamental parts 20 of a given feed port flower type have a different appearance from the other type such as those representatively shown in FIGS. 3A-3C. However, all of the connecting parts 22 have a same size and configuration so that any feed port flower may be inserted into a respective feed port opening of either of bases 34 and 36 to connect the feed port flower to the respective base.

The connecting parts 22 are secured within the feed ports 44, such as by a snap fit. Alternatively, the connecting part 22 of the feed port flowers could have a threaded design complementary with feed ports 44 having threaded openings, or a friction fit, or any other connecting structure suitable in cost and construction for use on a hummingbird feeder.

Once a feeder port flower enhancement type has been chosen, or if the base has pre-mounted feed port flowers or other enhancements, the consumer then selects a reservoir. Four possible reservoir designs 62, 64, 66, 68 are shown in FIGS. 4A, 4B, 4C and 4D. All four reservoirs have a bottleneck extension, generally designated by reference numeral 70, with external threads 72 and a bottom opening 74. The reservoirs also have a top opening 76 with threads 78 on the outer surface of the reservoir wall adjacent the top opening. The externally threaded bottleneck extensions 70 of all four reservoirs or vessels 62-68 are the same in size and thread count so that any of the vessels may be secured within the internally threaded top opening 40 of any of the bases 32-36.

Selection of the reservoir determines one of two cap designs as shown in FIGS. 5A and 5B. Both caps have a two-part construction and internal threads (not shown). The caps differ in size with the internal threads of the first cap 82 engaging with the reservoir wall threads 78 adjacent the top openings 76 of the reservoirs 62-64 shown in FIGS. 4A and 4B, respectively. The internal threads of the second cap 84 engage with the reservoir wall threads 78 of the reservoirs 66-68 shown in FIGS. 4C and 4D. Other cap designs could also be offered as alternative styles.

Figure 6:
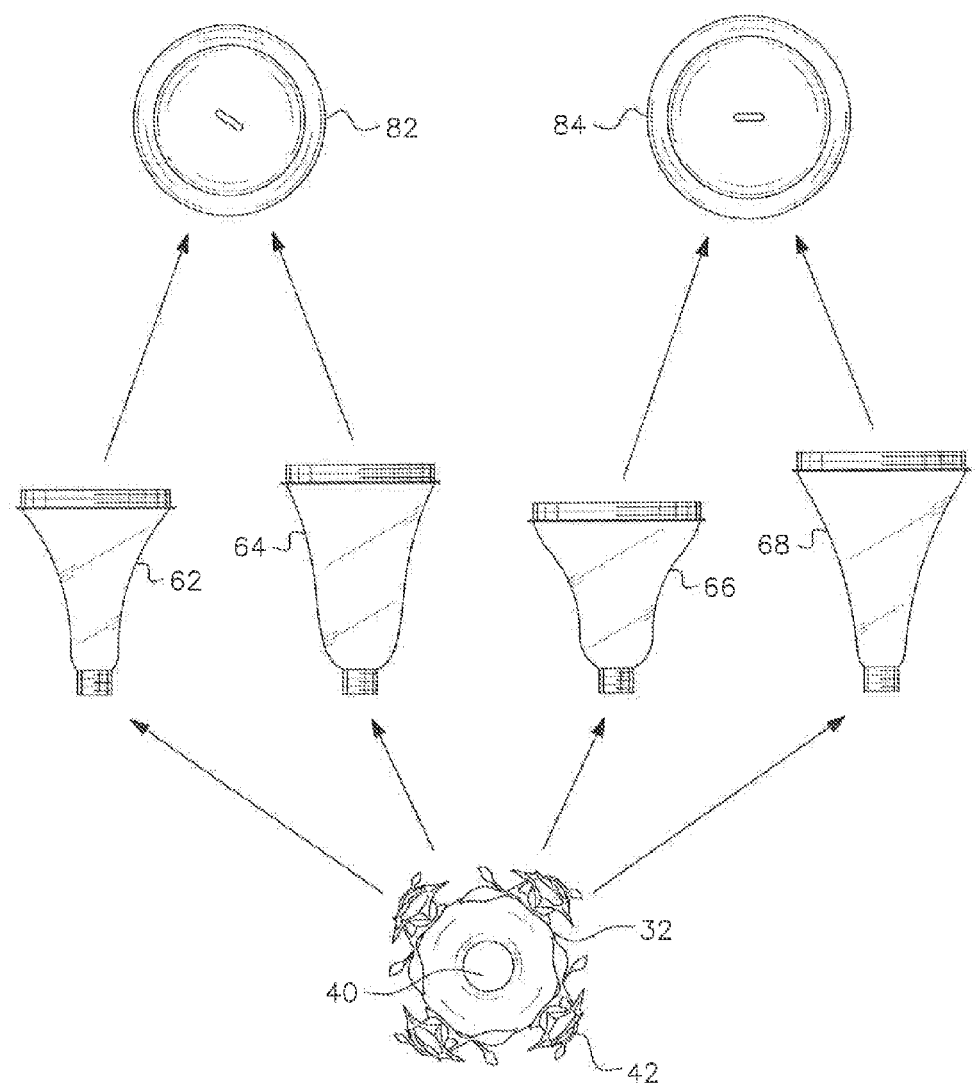
FIG. 6 illustrates the base of FIG. 2A, the availability of all four nectar vessels shown in FIGS. 4A-4D for use with that base, and the cooperative relationship between the two cap types of FIGS. 5A and 5B and the four vessels.

FIG. 6 sets forth the first base 32 with pre-mounted feed port flowers 42, and the four reservoirs 62-68 from which the consumer may select as a complementary part to the first base 32. The two caps 82, 84 are also shown along with their cooperative relationship with a respective two of the reservoirs, namely reservoirs 62 and 64, and reservoirs 66 and 68, respectively.

Figure 7:
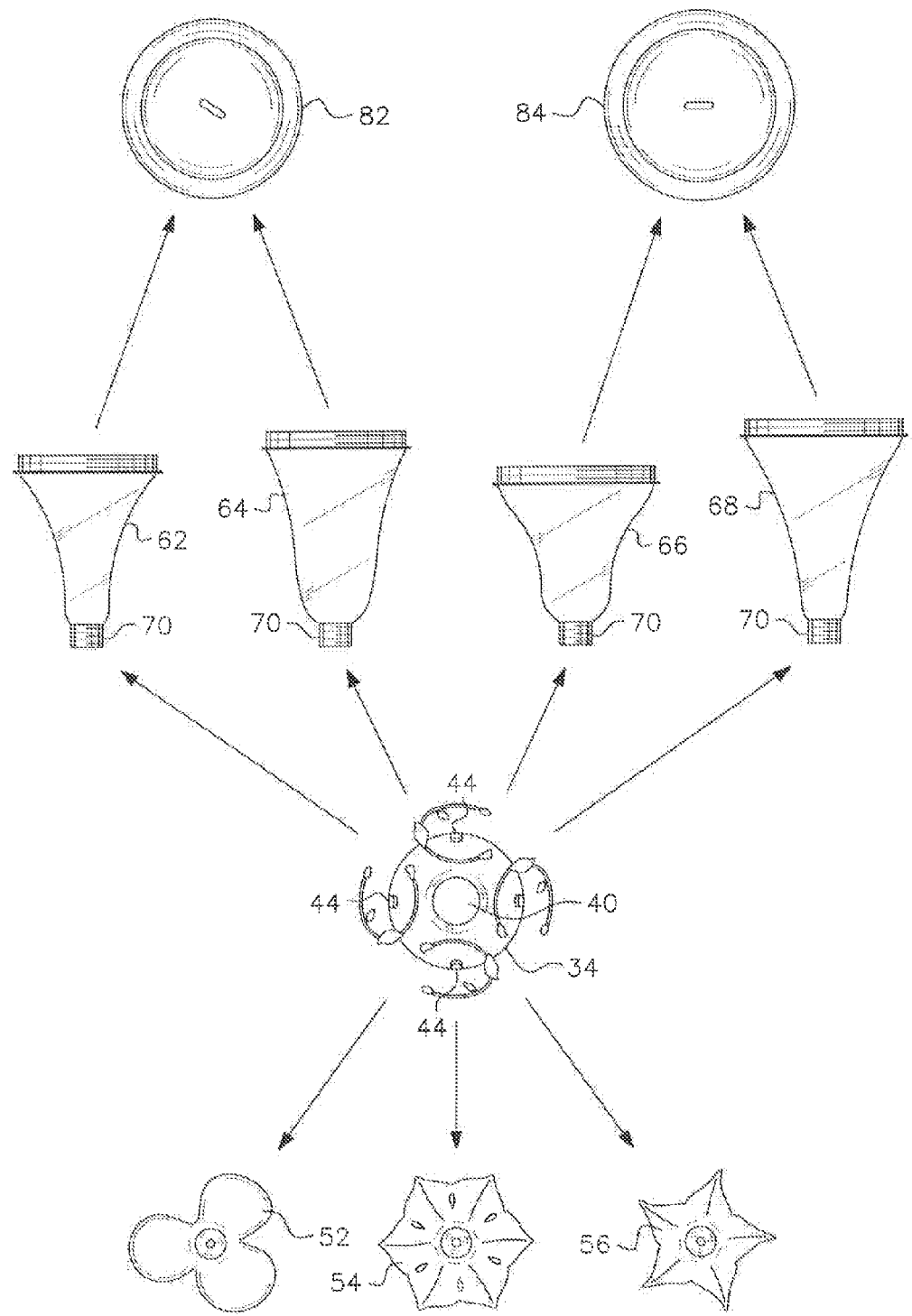
FIG. 7 illustrates the base of FIG. 2B, the three feed port flowers shown in FIGS. 3A-3C and usable with that base, the availability of all four nectar vessels shown in FIGS. 4A-4D for use with that base, and the cooperative relationship between the two cap types of FIGS. 5A and 5B and the four vessels.

FIG. 7 sets forth the second base 34 and the same four vessels 62-68 from which the consumer may select to form a complementary part to the second base 34. The two caps 82, 84 are also shown along with their cooperative relationship with a respective two of the reservoirs, namely reservoirs 62 and 64, and vessels 66 and 68, respectively. In addition, since the second base 34 does not include pre-mounted feed port flowers, the three choices of feed port flowers 52-56 are shown from which the consumer may choose to enhance the appearance and function of the feed ports in the base.

Figure 8:
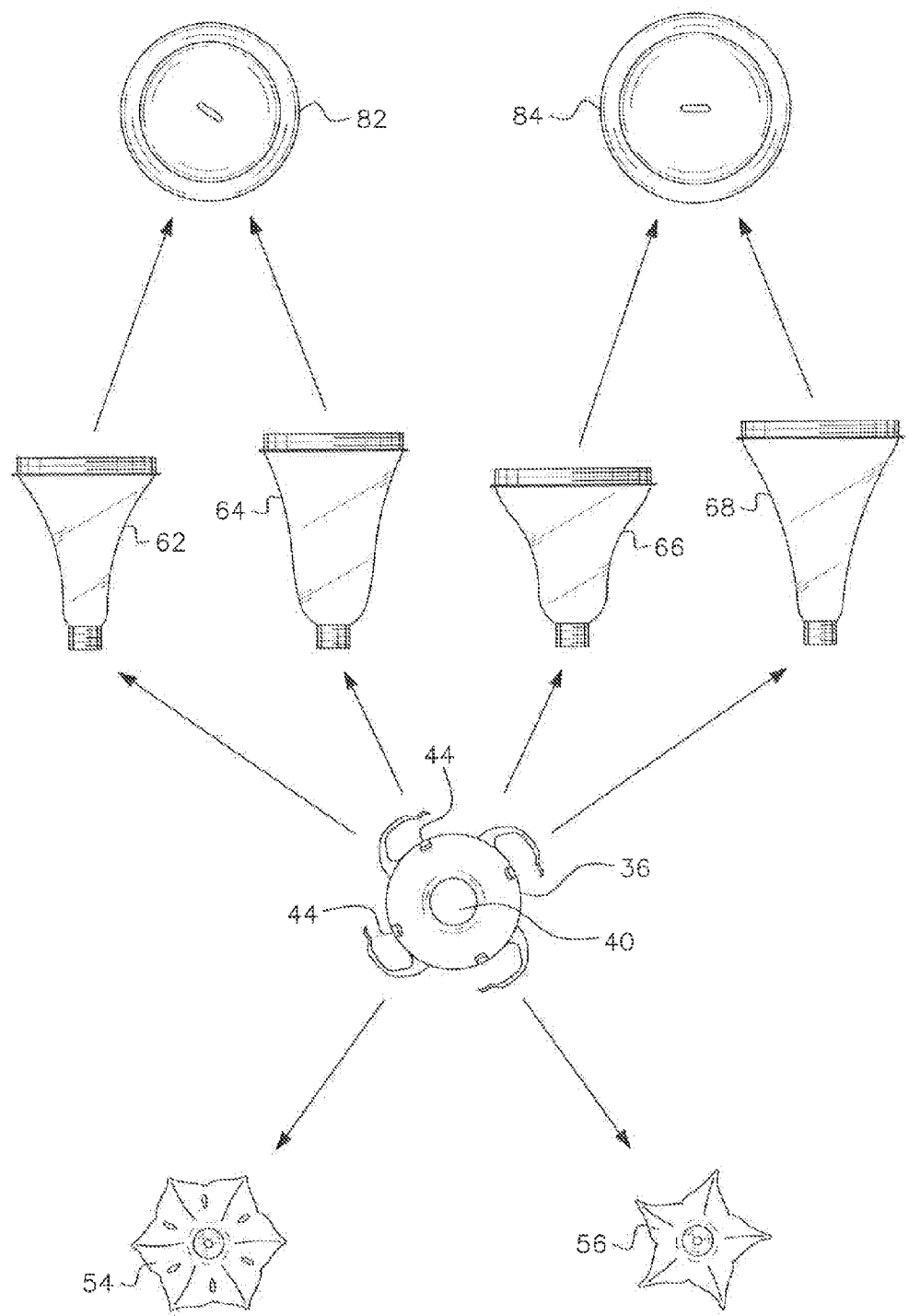
FIG. 8 illustrates the base of FIG. 2C, the feed port flowers of FIGS. 3B and 3C, the availability of all four nectar vessels shown in FIGS. 4A-4D for use with that base, and the cooperative relationship between the two cap types of FIGS. 5A and 5B and the four vessels.

The third base 36 is shown in FIG. 8, along with the same four reservoirs 62-68 from which the consumer may select as a complementary part to the third base 36. The two caps 82, 84 are also shown along with their cooperative relationship with a respective two of the reservoirs, namely vessels 62 and 64, and reservoirs 66 and 68, respectively. As with the second base 34 shown in FIG. 7, the third base 36 also does not include pre-mounted feed port flowers, at least two choices of feed port flowers 54 and 56 are shown from which the consumer may select. Other feed port flowers may also be available.

In building any of the feeders from the component combinations shown in FIGS. 6-8, the consumer follows the steps set forth in FIG. 1.

It is understood that the interchangeability of the modular components within the overall hummingbird feeder assembly is possible due to the standardization of the threaded openings 40 in the bases 32-36 and the threaded extensions 70 of the vessels 62-68 that are used to connect these two components. The connecting part 22 of the feed port flowers and the size of the feed ports 44 are also of standard dimensions so that the feed port flower types 52-56 are fully interchangeable within the bases 32-36.

Figure 9:
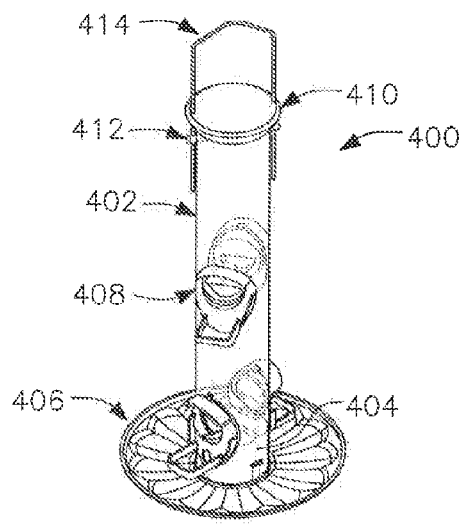
FIG. 9 is a perspective side view of a representative tube seed bird feeder that can be built by a consumer as a personalized seed bird feeder in accordance with the present invention.

The present invention also includes providing the consumer with the opportunity to build a seed bird feeder such as that shown in FIG. 9. As with the hummingbird feeders, the seed bird feeder is built from a plurality of interchangeable components as is evident from the exploded view of the seed bird feeder shown in FIG. 10 and generally designated by reference numeral 400. According to the illustrated embodiment, these components include a seed reservoir generally designated by reference numeral 402, a base generally designated by reference numeral 404, a tray generally designated by reference numeral 406, a plurality of feed port and perch assemblies generally designated by reference numeral 408, and a cap generally designated by reference numeral 410. While the base 404 is constructed to allow the feeder to be mounted on a pole, the seed bird feeder also includes a hanger rod generally designated 412 and wire generally designated 414 for hanging the bird feeder from a tree limb, horizontal peg, etc.

Figure 10:
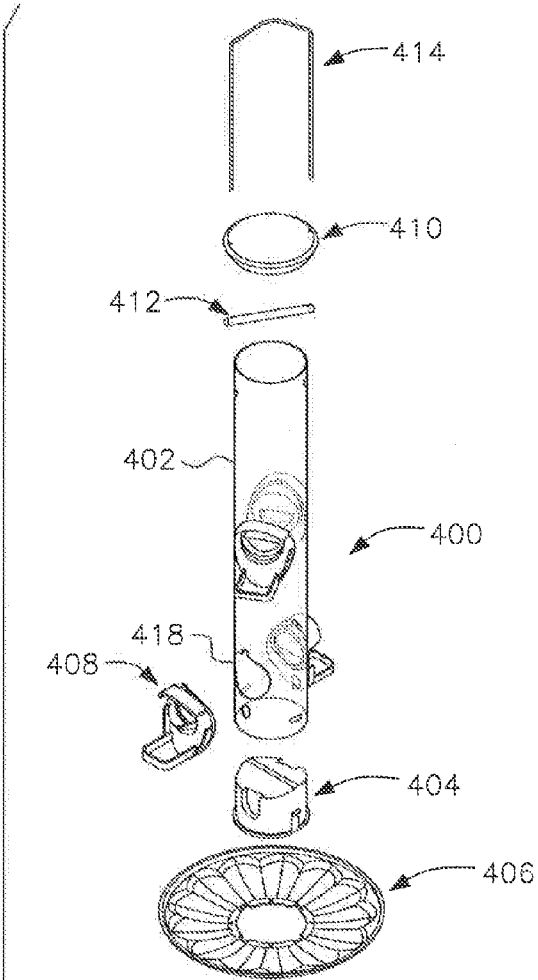
FIG. 10 is an exploded view of the components of the tube seed bird feeder shown in FIG. 9.
Figures 13D, 13E:
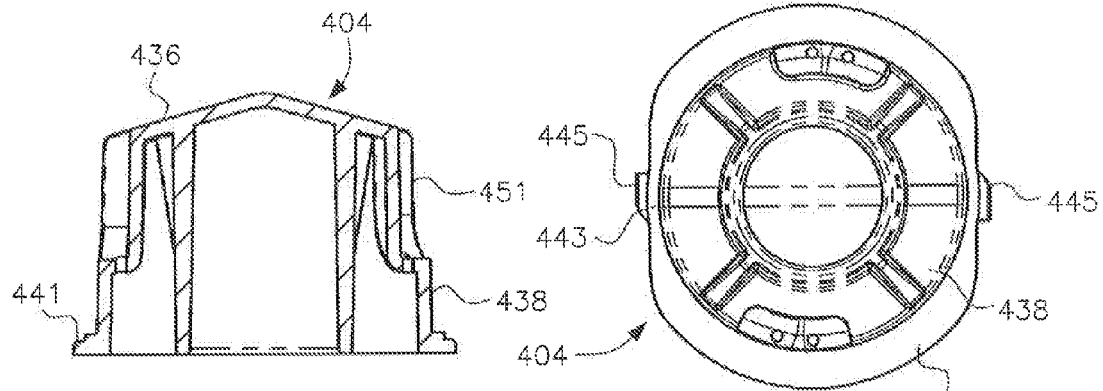
FIG. 13D is a cross sectional view of the base component taken along line A-A shown in FIG. 13C.
FIG. 13E is a bottom view of the base component of FIG. 13A.
Figures 13F, 13G:
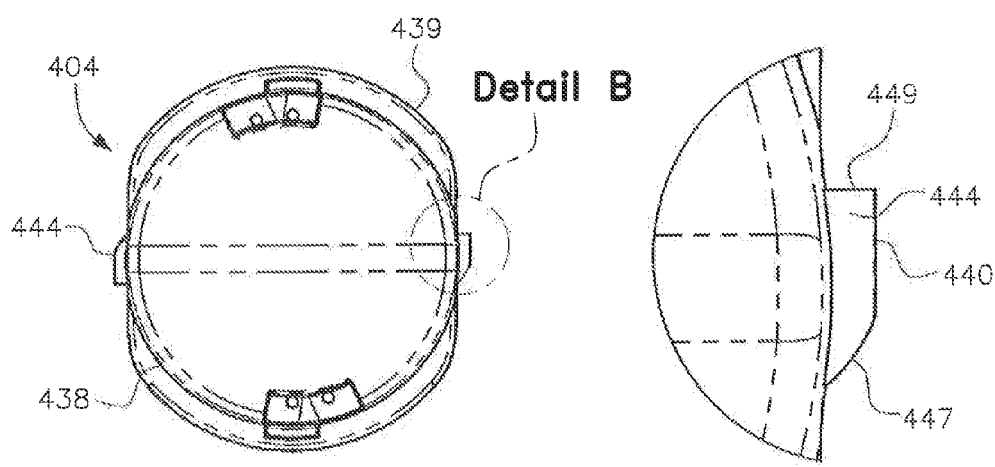
FIG. 13F is a top view of the base component shown in FIG. 13A.
FIG. 13G is an enlarged view of detail "B" shown in FIG. 13F.
Figure 14A:
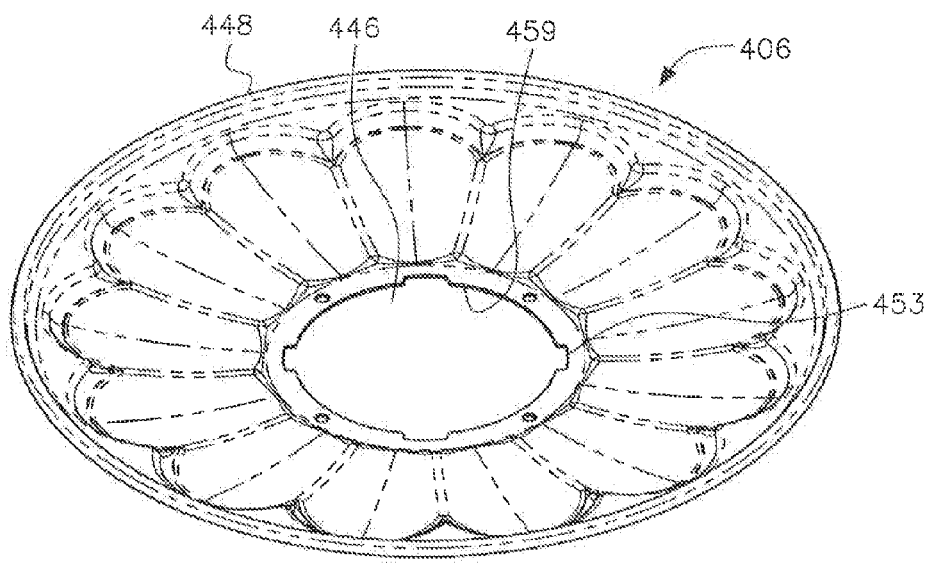
FIG. 14A is a perspective side view of the tray component for the feeder shown in FIGS. 9 and 10.
Figure 14B:
FIG. 14B is a side view of the tray component shown in FIG. 14A.

As shown in isolation in FIGS. 11A-11F, the reservoir 402 in the illustrated embodiment is constructed as a tube having a side wall 416 with a plurality of reservoir side wall openings 418 that each receive a feed port and perch assembly 408. As best seen in FIGS. 9 and 10, the tube in the illustrated embodiment has four side wall openings 418 that are spaced from one another along the length of the tube and also offset with respect to one another around the circumference of the side wall 416. The side wall openings 418 are generally circular with a notch 420 formed on an upper side of the opening 418. Below and spaced from the side wall opening is a feed port mounting aperture 422. As shown in FIG. 11F, the feed port mounting aperture is an elongated oval 424 with a flat base 426. The notch 420 and feed port mounting aperture 422 provide a simple and effective means of securing the feed port and perch assembly 408 to the sidewall opening 418 in the tube reservoir 402 as will be discussed hereinafter. Other structures for mounting the feed port and perch assemblies could also be used without departing from the scope of the present invention.

Each side wall opening 418, notch 420 and feed port mounting aperture 422 has a standardized size, shape and spacial relationship to accommodate different styles of feed port and perch assemblies having corresponding standardized structures made to be mounted within the side wall openings and secured in the notch and feed port mounting aperture formed in the tube. Similarly, the top 428 and bottom 430 of each of the tube reservoirs is of standardized sizing and configuration to allow any of the tubes to be combined with any of the caps and bases, respectively. Specifically, the top 428 of each tube reservoir has a common diameter with other tube reservoirs, which may vary in overall length, as well as with other types of reservoir designs (not shown). The bottom 430 of each tube reservoir 402 also shares a common diameter with other styles of reservoir designs (not shown) as well as with different length tubes, such as the longer tube reservoir generally designated by reference numeral 401 shown in FIG. 12. Generally, as the length of the tubular reservoir increases, the number of feed port and perch assemblies to be mounted to the tube will also increase. In the tube feeder reservoir 401 shown in FIG. 12, for example, six side wall openings with corresponding notches and feed port mounting apertures are provided in a staggered relationship around and along the length of the tube reservoir. The other structures of the reservoir 401 correspond with those discussed in connection with reservoir 400.

Each tube reservoir also includes a base coupling aperture 432, best seen in FIG. 11D, on two opposing sides of the tube. The base coupling apertures 432 are positioned adjacent the bottom 430 of the tube and are radially offset from the lowermost feed port mounting apertures 422. In the illustrated embodiment, the offset is approximately 90 degrees around the circumference of the side wall 416.

Finally, the tube reservoir 402 includes two horizontally aligned hanger rod supporting holes 434 in opposing sides of the reservoir side wall 416 adjacent the top 428 of the tube. The hanger rod supporting holes 434 are sized to receive the hanger rod 412 (see FIGS. 19A-19C) and to support the hanger rod 412 in a generally transverse relationship with the longitudinal axis of the tube reservoir as will be discussed further hereinafter.

While only tubes are shown, other reservoir shapes may also be designed for inclusion within the build-a-seed bird feeder system and method available according to the present invention.

The next component to be selected by the consumer is a base 404, as representatively shown in FIGS. 13A-13G. The base may be made of metal, plastic or other material(s) but in the illustrated embodiment is made of metal.

The base 404 has a body 436 with a substantially cylindrical side wall 438, a lower rim 439 and a base mounting protrusion 440 on two opposing sides adjacent the rim 439 above an area 442 on the side wall that can be substantially flat or rounded to conform with the curvature of the cylindrical side wall 438. Each base mounting protrusion 440 has a ramped upper surface 444, a generally flat bottom surface 445, a ramped side 447, and a flat side 449 (see FIG. 13G). The slope of the ramped side 447 provides a lead-in when twisting the tube to remove the base. The ramped upper surface 444 facilitates insertion of the base into the bottom of the tube 402 reservoir, while the flat bottom surface 445 prevents the base from being easily pulled back out once the base mounting protrusions 440 are received within the base coupling apertures 432 to mount the base to the tube reservoir 402.

The lower rim 439 of the base extends outwardly beyond the diameter of the base side wall 438 between the base mounting protrusions 440. The base edge 443 below the base mounting protrusions 440 is substantially flush with the side wall 438 so as not to interfere with insertion of the base mounting protrusions 440 into the tube reservoir 402 and into engagement with the base coupling apertures 432 when the base is mounted to the reservoir 402.

On opposing sides of the body, approximately 90 degrees offset from the base mounting protrusions 440, are tray positioning protrusions 441. Above the tray positioning protrusions 441 are recesses 451 which provide clearance for the base mounting part 510 of the lowermost feed port and perch assemblies 408. The tray positioning protrusions 441 mate with complementary notches 453 on the tray 406 to secure the tray as will be described hereinafter.

The tray 406, as shown in FIGS. 14A-14D, is also a user-selectable component and has a generally circular center aperture 446 and a generally cylindrical outer edge 448. The diameter of the center aperture 446 is large enough to accommodate the tube while the inner edge 459 of the aperture 446 has a plurality of notches 453 therein spaced from one another by a distance that corresponds with the spacing of the tray positioning protrusions 441 on the base. To secure the tray 406 to the base, the tray positioning protrusions 441 are lined up with and inserted into the notches 453. The engagement between the protrusions 441 and the notches 453 prevents rotation of the tray, while the inner edge 459 of the tray is supported on the rim 430. The tray 406 serves to catch seeds that fall from the feed port and perch assemblies and also provides an alternate perching area for larger birds.

To couple the base 404 to the tube reservoir 402 after the tray 406 has been aligned and engaged with the tray positioning protrusions 441, the body 436 of the base is inserted into the bottom 430 of the tube with the base mounting protrusions 440 in vertical alignment with the base coupling apertures 432. As the body is being inserted, the reservoir side wall 416 is deformed or stretched by the protrusions 440 to allow the body 436, with the base mounting protrusions 440 pressed against the inner surface of the reservoir side wall 416, to be pushed into the bottom of the tube reservoir 402. When the body is fully inserted, the base mounting protrusions 440 will snap fit into the base coupling apertures 432 and the edge at the bottom 430 of the reservoir side wall will be adjacent the inner edge 459 of the tray 406.

Figure 15B:
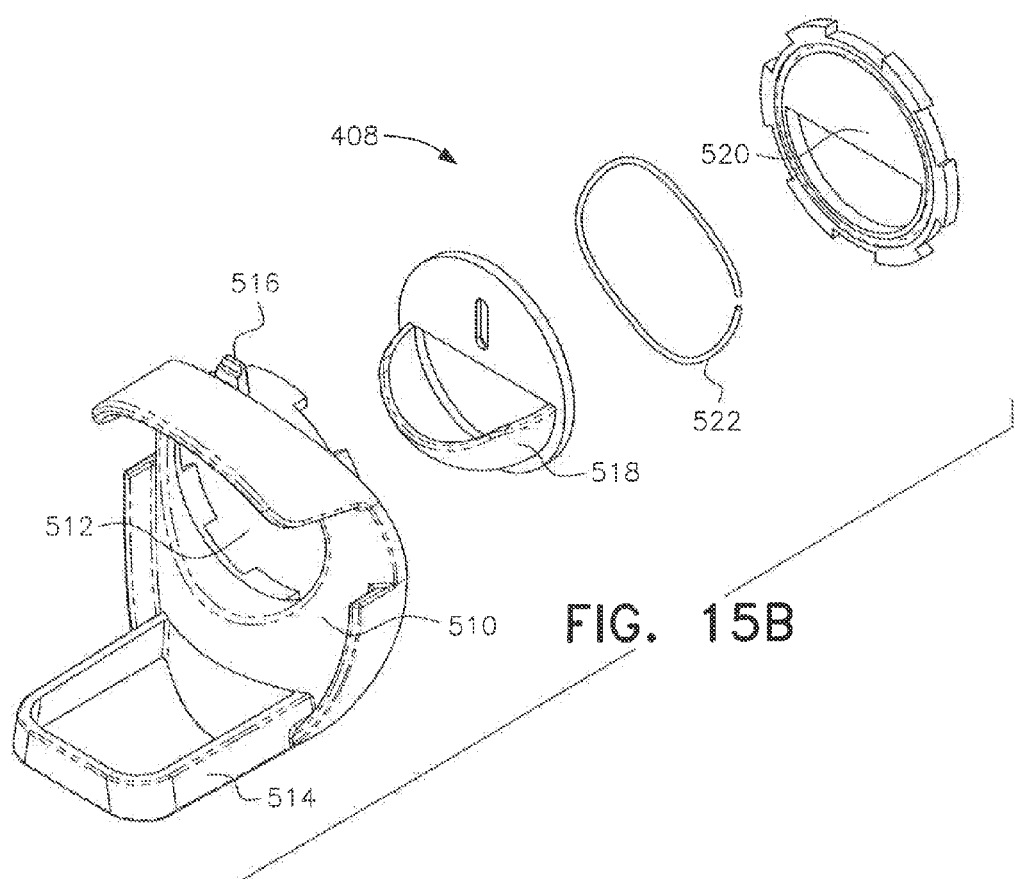
FIG. 15B is an exploded view of the elements that are assembled to form the feed port and perch assembly shown in FIG. 15A.
Figure 15C:
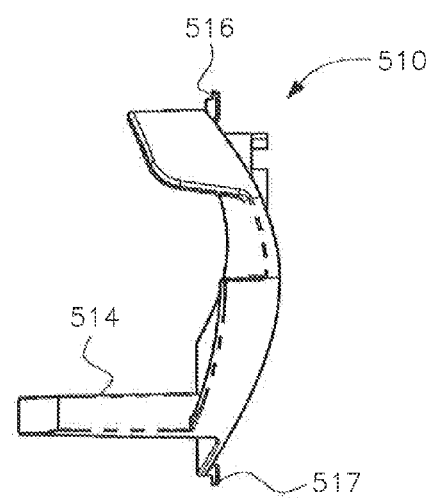
FIG. 15C is a side view of the mounting part of the feed port and perch assembly shown in FIGS. 15A and 15B.
Figure 15D:
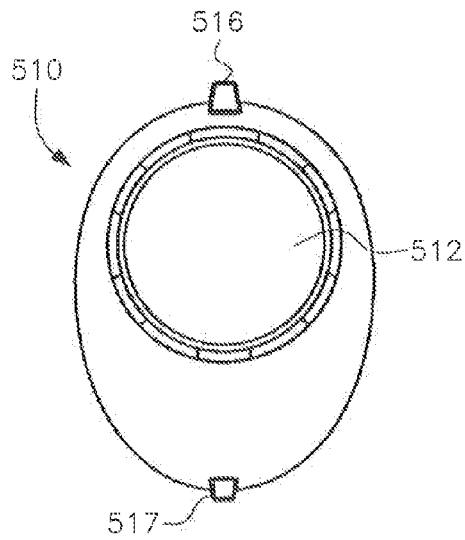
FIG. 15D is a back view of the mounting part shown in FIG. 15C.
Figure 15E:
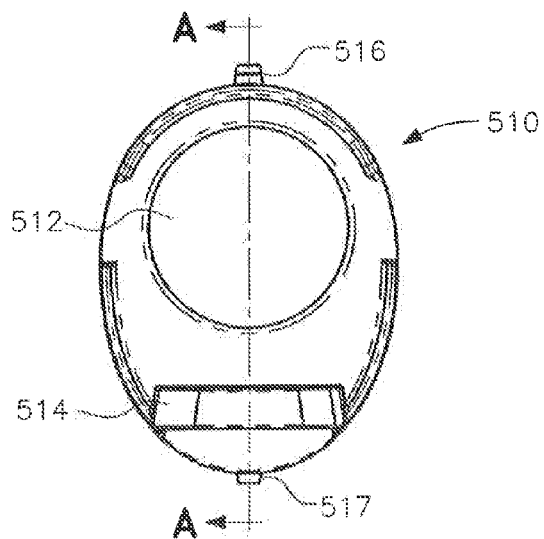
FIG. 15E is a front view of the mounting part shown in FIG. 15C.
Figure 15F:
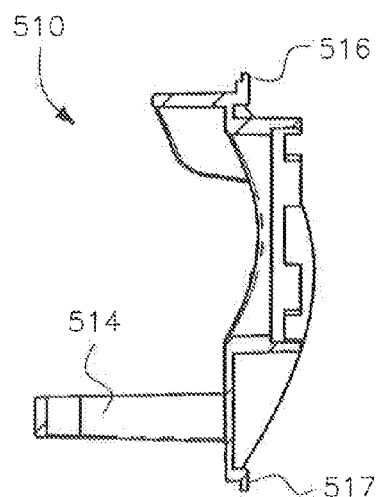
FIG. 15F is a sectional view of the mounting part taken along line A-A shown in FIG. 15E.
Figure 15G:
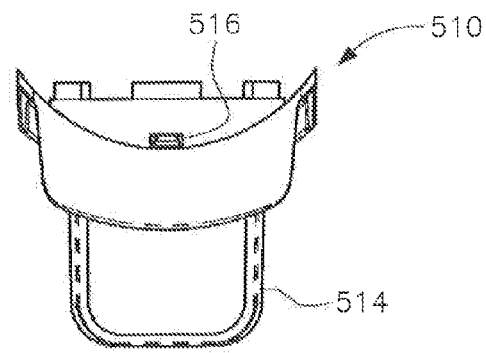
FIG. 15G is a top view of the mounting part shown in FIG. 15C.
Figure 16E:
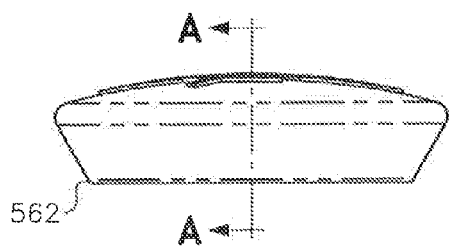
FIG. 16E is a side view of the cap component shown in FIG. 16B rotated 90 degrees.
Figure 16F:
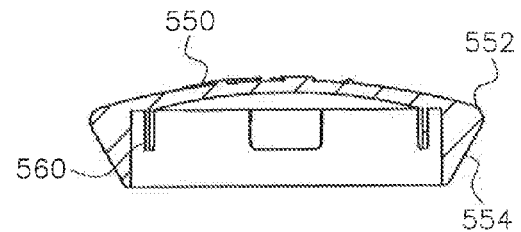
FIG. 16F is a cross sectional view of the cap component taken along line A-A of FIG. 16E.
Figure 16G:
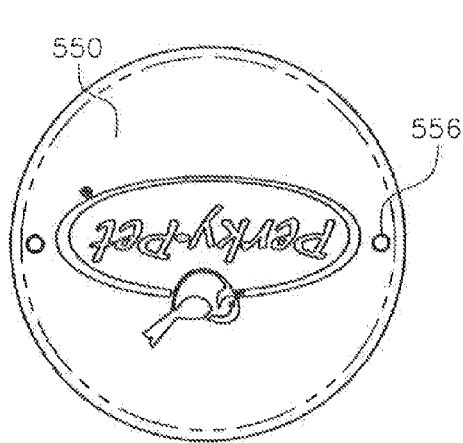
FIG. 16G is a top view of the cap component shown in FIG. 16A.
Figure 16H:
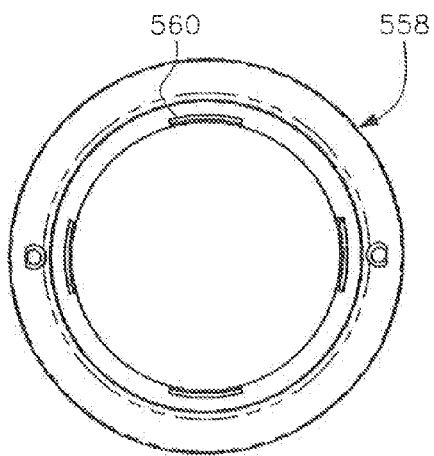
FIG. 16H is a bottom view of the cap component shown in FIG. 16A.
Figure 17A:
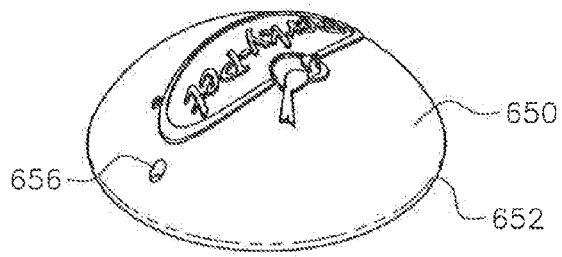
FIG. 17A is a perspective side view of another cap component design available to the consumer in accordance with the present invention.
Figure 17B:
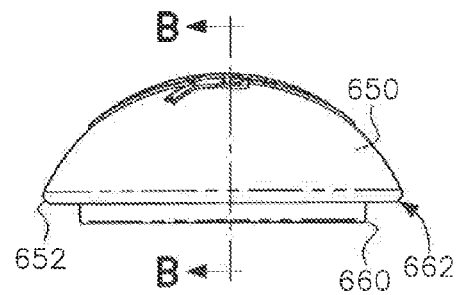
FIG. 17B is a side view of the cap component shown in FIG. 17A.
Figure 17C:
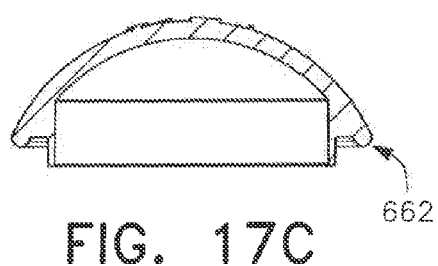
FIG. 17C is a cross sectional view taken along line B-B of FIG. 17B.
Figure 17D:
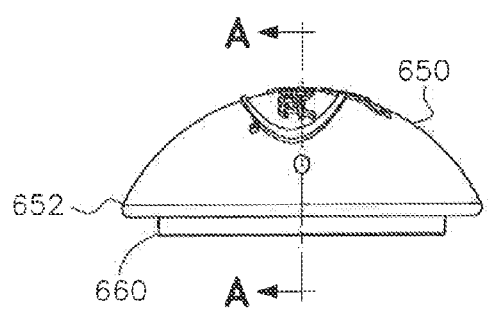
FIG. 17D is a side view of the cap component shown in FIG. 17B rotated 90 degrees.
Figure 17E:
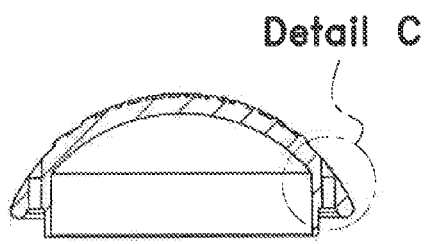
FIG. 17E is a cross sectional view taken along line A-A of FIG. 17D.
Figure 17F:
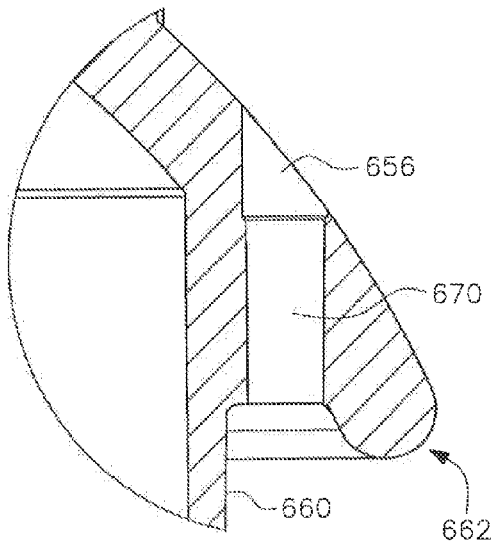
FIG. 17F is an enlarged view of detail "C" shown in FIG. 17E.
Figure 17G:
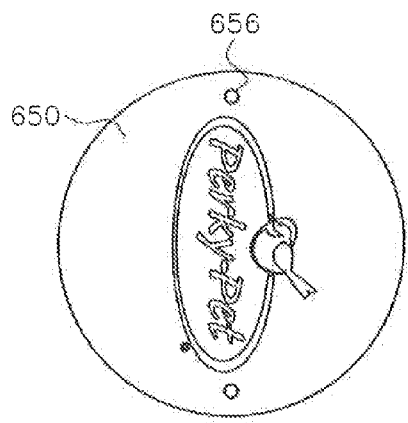
FIG. 17G is a top view of the cap component shown in FIG. 17A.
Figure 17H:
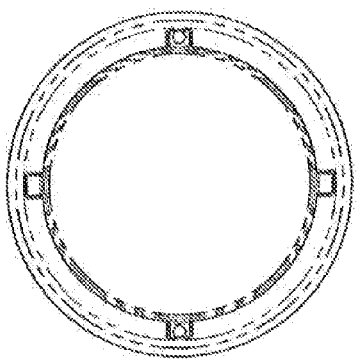
FIG. 17H is a bottom view of the cap component shown in FIG. 17A.
Figure 18A:
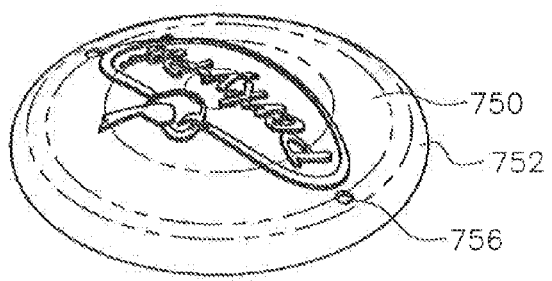
FIG. 18A is a perspective side view of another cap component design available to the consumer in accordance with the present invention.
Figure 18B:
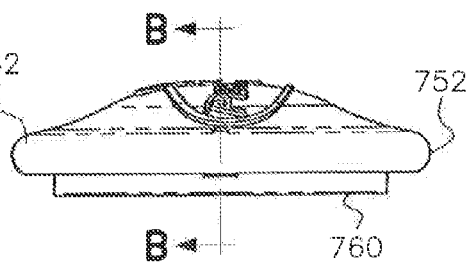
FIG. 18B is a side view of the cap component shown in FIG. 18A.
Figure 18C:
FIG. 18C is a cross sectional view of the cap component taken along line B-B of FIG. 18B.
Figure 18D:
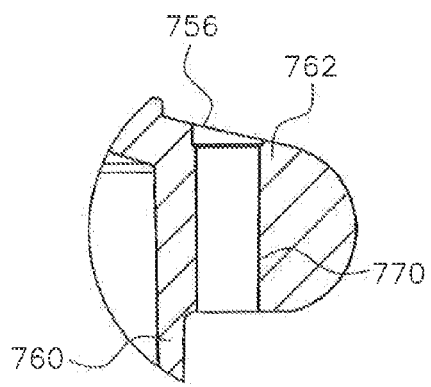
FIG. 18D is an enlarged view of detail "C" shown in FIG. 18C.
Figure 18E:
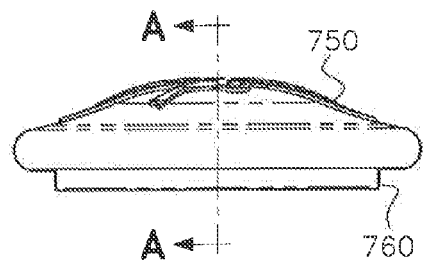
FIG. 18E is a side view of the cap component shown in FIG. 18B rotated 90 degrees.
Figure 18F:
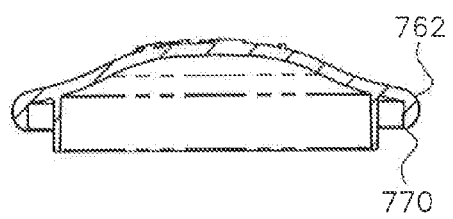
FIG. 18F is a cross sectional view taken along line A-A of FIG. 18E.
Figure 18G:
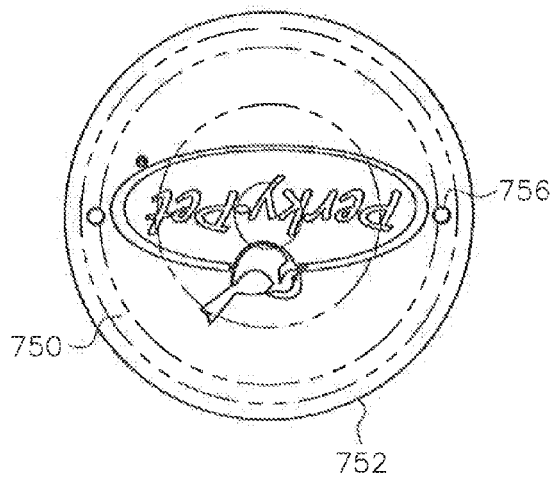
FIG. 18G is a top view of the cap component shown in FIG. 18A.
Figure 18H:
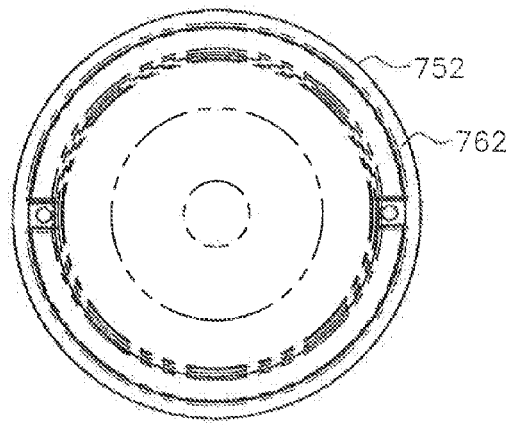
FIG. 18H is a bottom view of the cap component shown in FIG. 18A.

A representative feed port and perch assembly 408 is shown as assembled in FIG. 15A, and in an exploded configuration in FIG. 15B. The assembly includes a mounting part 510 sized to cover the reservoir side wall openings with a central opening 512 and an outwardly extending perch 514.

As shown in greater detail in FIGS. 15C-15G, the mounting part 510 includes an upwardly directed tab 516 that is received within the notch 420 in the reservoir side wall opening 418 when the assembly 408 is being coupled to the reservoir. The lower edge of the mounting part has a lower tab 517 that is received within the feed port mounting aperture 422. To secure the feed port and perch assembly to the reservoir, the upper tab 516 is inserted into the notch 420, the lower tab 517 is inserted into the feed port mounting aperture 422, and then the base mounting part 510 is moved downwardly with respect to the reservoir until the lower tab 517 is received within the flat base 426 of the feed port mounting aperture 422. The upward extension of the upper tab is of sufficient length that the top part of the upper tab remains captured by the notch 420 when the lower tab is received in the flat base 426 so that the feed port and perch assembly is locked against the reservoir side wall.

In addition to the base mounting part 510, the feed port and perch assembly includes a rotatable apertured piece 518 that fits within the central opening 512 in the base mounting part, a locking ring 520 that is secured to the rear of the base mounting part, and a spring 522 that is held between the locking ring and the rear of the mounting part. The illustrated feed port and perch assembly is more fully described in U.S. Pat. No. 7,469,656, which is owned by the assignee of the present application and is hereby expressly incorporated by reference as if fully set forth herein in its entirety.

Other configurations for the feed port, either with or without an integral perch could also be used as would be understood by persons of skill in the art. What is required is that the mounting part be configured to be cooperative with the size and shape of the reservoir side wall opening so as to be mountable to the reservoir in communication with the reservoir side wall opening to provide seed access to feeding birds.

Three possible cap designs are illustrated in the drawings: a first embodiment shown in FIGS. 16A-16G; a second embodiment shown in FIGS. 17A-17G; and a third embodiment shown in FIGS. 18A-18G, respectively.

The cap shown in FIGS. 16A-16G has a shallow dome-like upper surface 550 with an outer periphery 552 and an inwardly tapering sidewall 554 extending downwardly from the outer periphery of the upper surface. Two holes 556 are formed adjacent the outer periphery 552 and on opposing sides of the upper surface 550.

A lower surface of the cap generally designated by reference numeral 558 has a downwardly directed, generally cylindrical flange 560 that fits within the top of the reservoir tube. The flange 560 is spaced inwardly from the lower edge 562 of the sidewall to provide room to receive the reservoir side wall between the flange 560 and the cap sidewall 554.

Figure 19A:
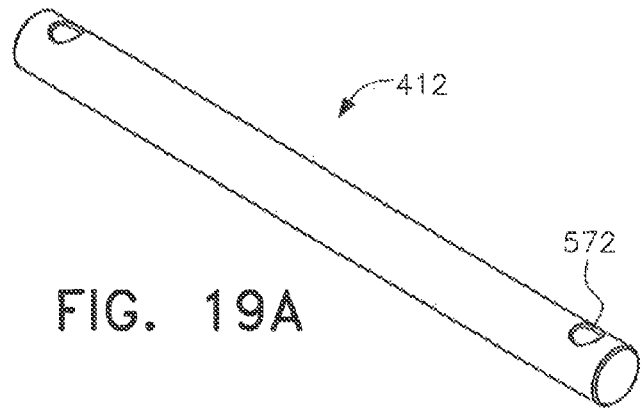
FIG. 19A is a perspective side view of the hanger rod for the feeder shown in FIGS. 9 and 10.
Figure 19B:
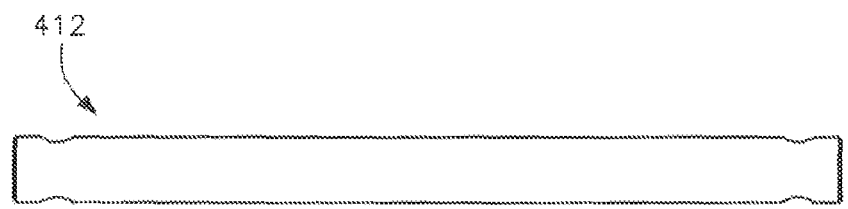
FIG. 19B is a side view of the hanger rod shown in FIG. 19A.
Figure 19C:
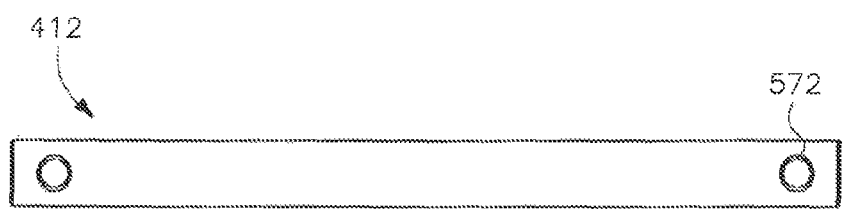
FIG. 19C is a top view of the hanger rod shown in FIG. 19A.
Figure 20A:
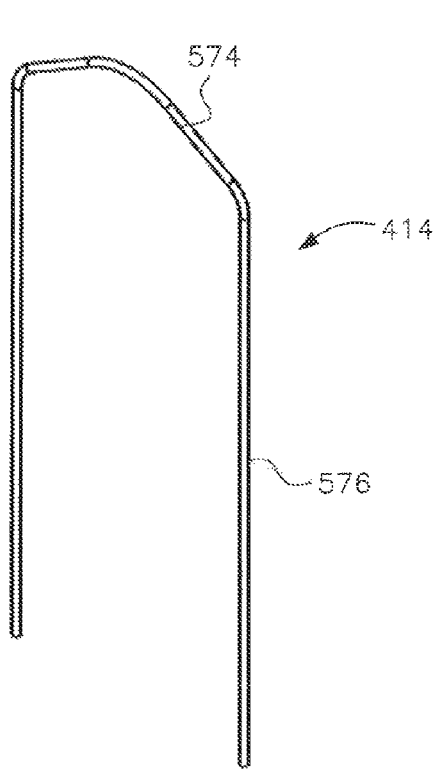
FIG. 20A is a perspective side view of the hanger wire for the feeder shown in FIGS. 9 and 10.
Figure 20B:
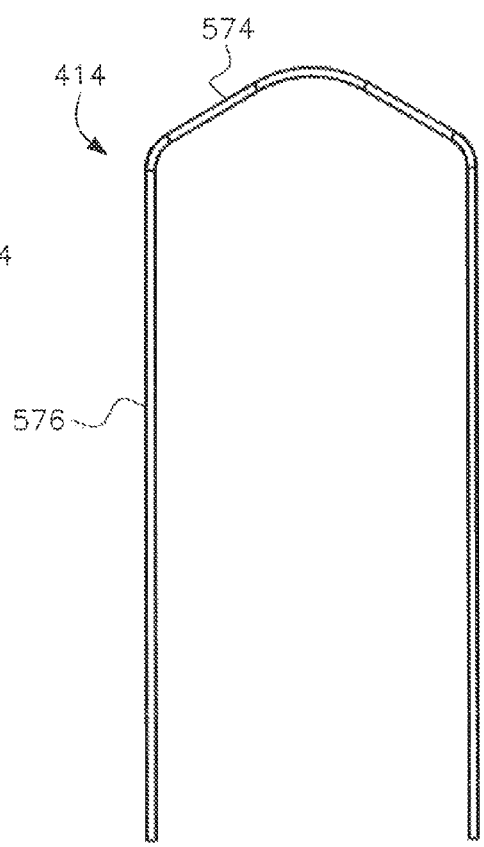
FIG. 20B is a front view of the hanger rod shown in FIG. 20A.

Two hanger mounting apertures 570 are formed through opposing sides of the sidewall 554 in vertical alignment with the two holes 556 in the cap upper surface 550. The hanger mounting apertures 570 are also vertically aligned with apertures 572 formed on each end of the hanger rod 412, as shown in FIGS. 19A-19C. The hanger wire 414, shown in FIGS. 20A and 20B, has a handle portion 574 and two downwardly directed legs 576. The legs 576 are received through the holes 556, the hanger mounting apertures 570 and then through the hanger rod apertures 572. Once inserted, the ends of the legs are bent at about a 90 degree angle (not shown) to prevent the hanger wire from being separated form the tube reservoir and the cap.

The second cap embodiment, FIGS. 17A-17G, has a full dome-shaped upper surface 650 and a generally cylindrical cap base insert 660. The cap base insert 660 is received within the top of the reservoir tube. The outer diameter of the upper surface 650 is greater than the outer diameter of the cap base insert 660 forming an overhang generally designated by reference numeral 662. As in the first embodiment, two holes 656 are formed on opposing sides of the upper surface 650. The holes 656 are positioned near enough to the outer periphery 652 of the upper surface to be outside the diameter of the cap base insert 660 and above the overhang 662.

Two hanger mounting apertures 670 (see FIG. 17F) are formed through opposing sides of the overhang 662 in vertical alignment with the two holes 656 in the cap upper surface 650. As in the first embodiment, the hanger mounting apertures 670 are also vertically aligned with the apertures 572 formed on each end of the hanger rod 412, so that the legs 576 of the hanger wire 414 can pass through the holes 656 in the cap upper surface, through the hanger mounting apertures 670 in the overhang and through the apertures 572 on each end of the hanger rod. The hanger wire is secured in the same way as in the first embodiment.

The third cap embodiment, FIGS. 18A-18G, has a mushroom-shaped upper surface 750 and a generally cylindrical cap base insert 760. Like in the second embodiment, the cap base insert 760 is received within the top of the reservoir tube.

The outer diameter of the upper surface 750 is greater than the outer diameter of the cap base insert 760 and forms an outwardly extending ridge 762. as in the first and second embodiments, two holes 756 are formed on opposing sides of the upper surface. The holes 756 are positioned near enough to the outer periphery 752 of the upper surface to be outside the diameter of the cap base insert 760 so that the holes 756 pass vertically through holes 770 in the ridge 762.

The holes 770 in the ridge 762 are vertically aligned with the apertures 572 formed on each end of the hanger rod 412, so that the legs 576 of the hanger wire can pass through the holes 770 in the ridge 762 and through the apertures on each end of the hanger rod in the same manner as already described in connection with the first and second cap embodiments.

The order described above in which the various components of the tubular seed feeder are selected does not necessarily represent the order in which the consumer has to make his or her selections. On the contrary, when building his or her feeder, the consumer may choose to select the tray design first, followed by a base, followed by a reservoir, etc. Hence, the components can be selected in virtually any order and the order described herein is representative only.

As described above, according to the modular system of the present invention, a specific style for each of the feeder components of either a hummingbird feeder or a seed feeder is selected from a variety of style alternatives. As the components are modular, any combination of component styles can easily be assembled into a user-desired feeder configuration. From a manufacturing standpoint, the components and their various styles form a baseline set of parts so that no significant changes or adjustments in the manufacturing process are required regardless of which combination of alternative components is selected by the consumer.

Accordingly, the present invention provides an improved method of marketing hummingbird feeders and seed bird feeders, and related accessories, using an on-line store front represented by the build-a-feeder web site. At the web site, a range of style choices for individual feeder components are presented. The web site is configured to allow the consumer to combine any of the displayed component styles in a multiplicity of ways to build a customized feeder. The manufacturer can build the feeder to meet the consumer's order at a single inventory location by relying on a baseline set of feeder parts, and ship the feeder directly to the consumer.

Figure 21:
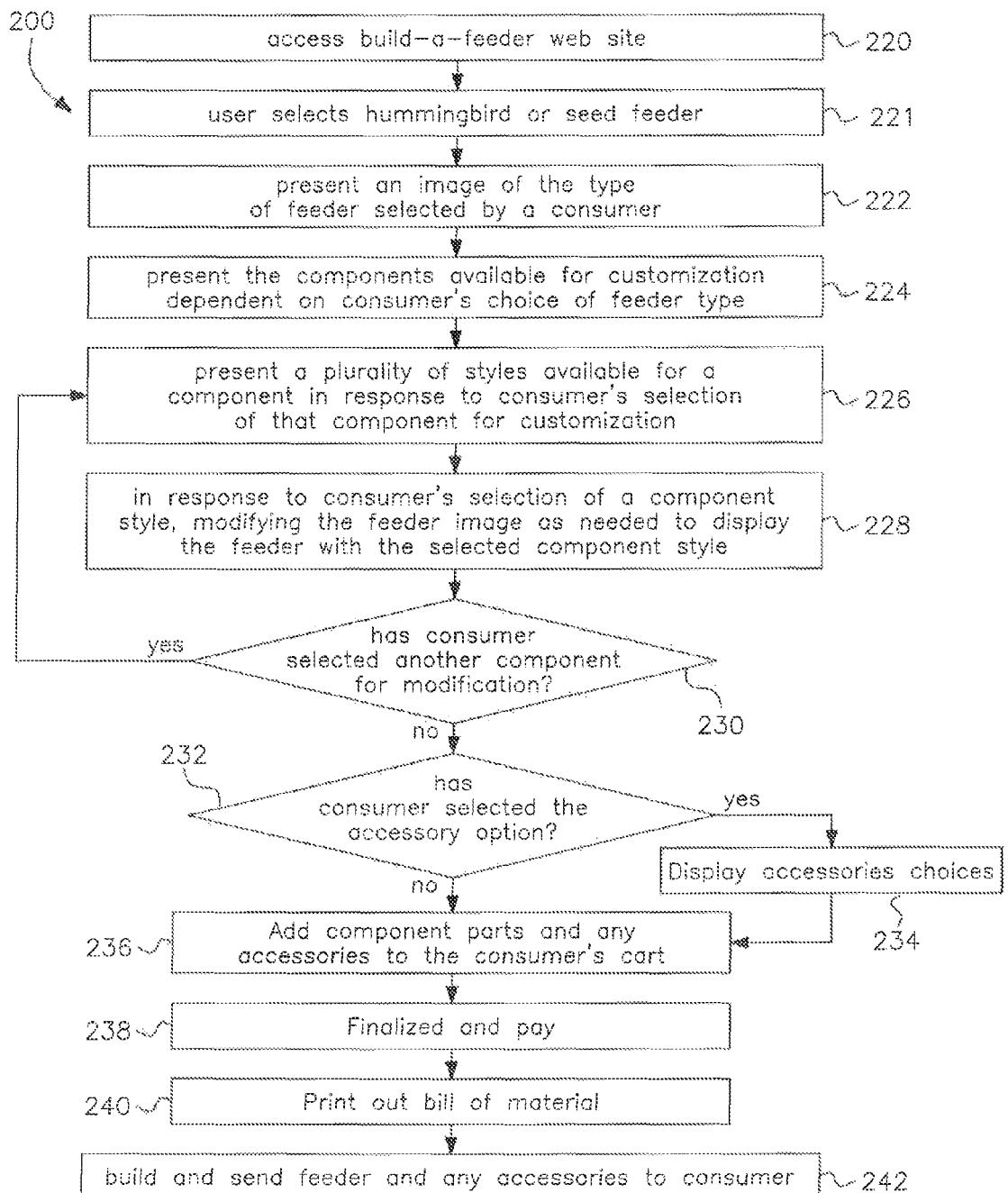
FIG. 21 is a flow chart summarizing the method of marketing consumer-built bird feeders using a distributed computer network in accordance with the present invention.

As set forth in FIG. 21, this method of marketing, generally designated by reference numeral 200, includes the steps of providing the consumer with a web site having the build-a-feeder program, step 220. When a consumer accesses the web site and selects the build-a-feeder program option, the method allows the consumer to choose whether to build a hummingbird feeder or a seed feeder, step 221. The method proceeds by presenting an enlarged image of the type of feeder that was selected by the consumer, step 222. Thereafter or concurrently, the method presents the consumer with a listing of the components that are available for customization as determined by the consumer's choice of feeder type, step 224.

In response to the consumer's selection of a particular component, the method presents the consumer with a plurality of design styles available for the selected component, step 226. Upon receipt of an input indicating the consumer's selection of a particular component style, the method modifies the enlarged feeder image as needed to display the feeder with the selected component style, step 228.

The method then determines whether the consumer has selected an additional component for customization, step 230. If the consumer has selected another component, the method presents the consumer with a plurality of design styles available for the additional component selected for customization, step 226. Upon receipt of an input indicating the consumer's selection of a particular component style, the method modifies the feeder image as needed to display the feeder with the selected component style, step 228. Steps 226 through 230 are repeated as often as necessary in response to the consumer's inputs.

The method also provides the consumer with an opportunity to order accessories, step 232. If the consumer has selected the accessory option, the method displays the accessories available, step 234. Accessories may include, but are not limited to, nectar, cleaning mops, ant guards, seed, baffles, poles, wild bird books, etc. One or more accessories may be ordered by the consumer to complement or otherwise work with the feeder that will be built in accordance with the consumer's component selections.

Once all component parts and accessories have been selected, the method adds the component parts and any accessories to the consumer's cart, step 236. The method proceeds by displaying a checkout page that allows the consumer to finalize and pay for his or her purchase, step 238. The method stores a bill of materials setting forth the items selected by the consumer to a server where it is then printed out at the manufacturing facility, step 240. The manufacturing facility then pulls the necessary parts from inventory, builds the feeder, and ships the feeder and any accessories that were ordered to the consumer, step 242.

Figure 22:
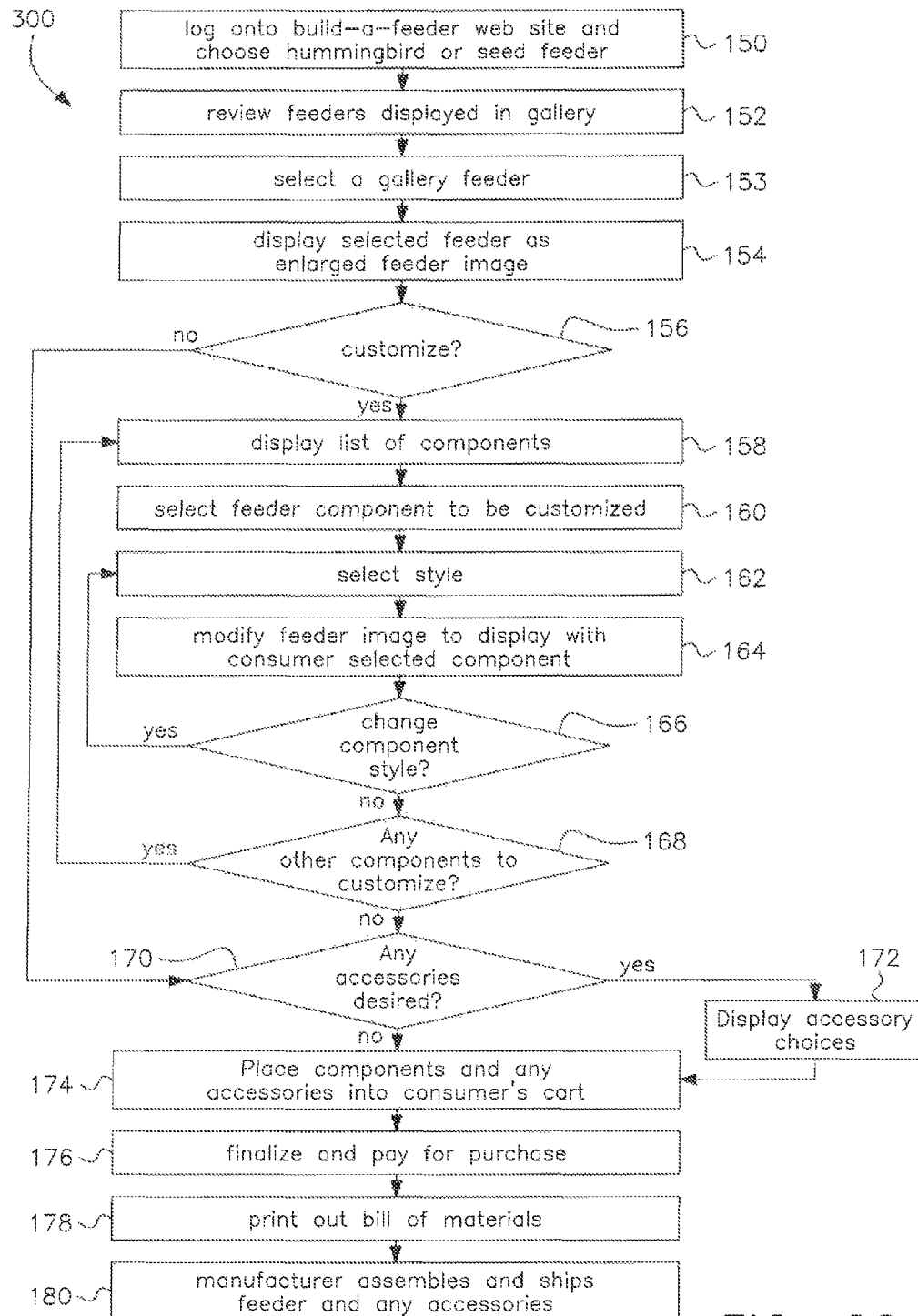
FIG. 22 is a flow chart summarizing the process of selecting a previously designed feeder and purchasing the feeder either "off the rack" or after personalizing the "off the rack" feeder.

In addition to building a hummingbird and seed feeder from scratch, the present invention also provides the consumer with the option of customizing one of several existing designs which are displayed in a "gallery" on the build-a-feeder web site. The gallery selection and customization option, generally designated by reference numeral 300, is shown in FIG. 22.

According to the method 300, the consumer logs onto the build-a-feeder web site and chooses hummingbird or seed feeders, step 150. In either case, the method presents a gallery option that allows the consumer to review a plurality of previously designed feeders, step 152. In response to the consumer's selection of one of the gallery feeders, step 153, the method displays the selected feeder as an enlarged feeder image, step 154.

The consumer can then purchase the gallery feeder as is or choose to customize the gallery feeder, step 156. If the consumer elects to customize, the method presents the consumer with the feeder components available for customization, step 158. The consumer selects a feeder component to customize, step 160, and then selects a style for that component, step 162. In response to the consumer's style selection, the method modifies the enlarged feeder image to display the gallery feeder as modified with the consumer's selected component style, step 164. The consumer then decides whether to keep the selected component or choose a different component style, step 166. If a different component style is desired, the method returns to step 162. If the style of the component is acceptable to the consumer, step 166, the method enables the consumer to choose another component to modify, step 168. If other components are to be customized, the method returns to step 158. If there are no other components to be customized, the method determines whether the consumer has selected the accessory option, step 170. If the consumer has selected the accessory option, the method displays the accessories available, step 172.

Once all component parts and accessories have been selected, the method adds the component parts and any accessories to the consumer's cart, step 174. The method proceeds by displaying a checkout page that allows the consumer to finalize and pay for his or her purchase, step 176. Placing items in a cart provided at a vendor's web site and paying for the purchase on line are well known to web consumers.

When the purchase is complete, a bill of materials setting forth the items selected by the consumer is stored to a server where it is then printed out at the manufacturing facility, step 178. The manufacturing facility then pulls the necessary parts from inventory, builds the feeder, and ships the feeder and any accessories that were ordered to the consumer, step 180.

Because the above marketing method is implemented using a distributed computer network, all of the necessary inventory can be maintained at a single location while consumers all over the world can potentially access the build-a-feeder web site, select the components they desire and have a feeder built and shipped to them. The system and method are highly efficient and, at the same time, provide the consumer with a wide range of design options not available with conventionally marketed bird feeders.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

What is claimed is:

1. A modular bird feeder system comprising:
a plurality of bases each having a different appearance, all of said bases having a connecting structure of a same size and configuration;
a plurality of nutrient reservoirs each having a different appearance, all of said reservoirs having a lower end configured to be coupled to the connecting structure of any of said bases to connect a respective reservoir to a respective base, each of said reservoirs having an upper end opening and a lower end opening, said lower end opening being closed by the base;
at least one cap configured to be secured to an upper end of said reservoirs to close said upper end opening; and
a feed port through which birds can access a nutrient being dispensed by said feeder;
said bases, reservoirs, cap and feed port being interconnectable with one another in a plurality of different combinations as each component is selected by a consumer to produce a plurality of differently styled bird feeders from a common component inventory; and
a web site having a build-a-feeder program, said web site configured to present the consumer with a plurality of feeder components available for customization and, in response to consumer selection of a first component type, to present the consumer with a plurality of styles available for the first component and, in response to the consumer's selection of a style, to determine whether the consumer has selected one or more additional components for customization and, if the consumer has selected one or more additional components for customization, to present the consumer with a plurality of styles available for each additional component.

2. The modular bird feeder system as set forth in claim 1, wherein said feeder is a hummingbird feeder and said feed port is in said base.

3. The modular bird feeder system as set forth in claim 2, further comprising a plurality of feed port enhancement types, each type having an ornamental part and a connecting part, each of said ornamental parts of a given type having a different appearance from the other types, all of said connecting parts having a same size and configuration to be inserted into a respective base feed port to connect said feed port enhancement to said base, any of said feed port enhancement types being connectable to the feed port of any of said bases.

4. The modular bird feeder system as set forth in claim 3, wherein said plurality of feed port enhancement types are various simulated flowers.

5. The modular bird feeder system as set forth in claim 3, wherein said connecting parts are secured within said feed ports with a snap fit.

6. The modular bird feeder system as set forth in claim 3, wherein said connecting parts are secured within said feed ports with a friction fit.

7. The modular bird feeder system as set forth in claim 1, further comprising a plurality of accessories for use in connection with said bird feeders.

8. The modular bird feeder system as set forth in claim 1, wherein said feeder is a seed feeder and said feed port is in said reservoir.

9. The modular bird feeder system as set forth in claim 8, wherein said base is configured to be connected to one of a plurality of trays, each tray having a different appearance.

10. The modular bird feeder system as set forth in claim 1, wherein said system is offered over the Internet.

11. The modular bird feeder system as set forth in claim 1, wherein said feeder is a seed feeder and includes a tube reservoir with at least one side wall opening, said feeder port including a mounting part sized and shaped to fit within said reservoir side wall opening and be coupled to said tube reservoir.

12. The modular bird feeder system as set forth in claim 11, wherein said cap has two apertures in an upper surface adjacent a perimeter of said upper surface, said modular bird feeder system further including a hanger wire and a hanger rod mounted transversely in said tube reservoir and extending outwards from said reservoir on each rod end, said rod ends having apertures that are in vertical alignment with said cap apertures, said hanger wire having legs that extend through the aligned apertures to secure the cap to the reservoir and a handle enabling the feeder to be suspended from a support element.

* * * * *